(12) United States Patent
Nakagawa

(10) Patent No.: US 7,728,400 B2
(45) Date of Patent: Jun. 1, 2010

(54) ELECTRO-OPTICAL DEVICE AND ELECTRONIC APPARATUS

(75) Inventor: Masashi Nakagawa, Chitese (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 11/843,869

(22) Filed: Aug. 23, 2007

(65) Prior Publication Data

US 2008/0061394 A1    Mar. 13, 2008

(30) Foreign Application Priority Data

Sep. 12, 2006   (JP)   ............................. 2006-246396
Jul. 19, 2007   (JP)   ............................. 2007-187942

(51) Int. Cl.
*H01L 31/0232* (2006.01)

(52) U.S. Cl. .......................... 257/435; 257/59; 257/72; 257/98

(58) Field of Classification Search ................. 257/435, 257/E31.122, 83, 84, 88, 89, 98, 99, 184, 257/187, 257–258; 438/48, 69, 70, 30, 128, 438/149, 151, 157, 161, 283
See application file for complete search history.

(56) References Cited

U.S. PATENT DOCUMENTS

| 5,847,381 | A   | * | 12/1998 | Isogai ..................... 250/208.1 |
| 6,885,417 | B2  |   | 4/2005  | Murade |
| 7,161,592 | B2  |   | 1/2007  | Murade |
| 7,586,122 | B2  | * | 9/2009  | You ............................ 257/59 |
| 2005/0253148 | A1 | * | 11/2005 | Yamazaki et al. ............. 257/72 |

FOREIGN PATENT DOCUMENTS

| JP | A 2001-330821 | 11/2001 |
| JP | A 2003-121879 | 4/2003 |
| JP | A-2004-046091 | 2/2004 |
| JP | A 2004-062145 | 2/2004 |

* cited by examiner

*Primary Examiner*—Wai-Sing Louie
*Assistant Examiner*—Sue Tang
(74) *Attorney, Agent, or Firm*—Oliff & Berridge, PLC

(57) ABSTRACT

An electro-optical device includes semiconductor layers disposed between a first substrate and an electro-optical layer. The semiconductor layers are provided at positions corresponding to crossover regions of scanning lines and data lines. Island light shielding films are disposed between the second substrate and the electro-optical layer. The island light shielding films are isolated from each other and at least partially overlapping a corresponding one of the semiconductor layers in plan view.

10 Claims, 13 Drawing Sheets

ELECTRO-OPTICAL DEVICE AND ELECTRONIC APPARATUS

BACKGROUND

1. Technical Field

The present invention relates to an electro-optical device having a pair of first substrate and second substrate, which are opposed to each other, and light shielding films; which are formed on the second substrate to shield light from entering corresponding transistors formed on the first substrate, and also relates to an electronic apparatus having the electro-optical device.

2. Related Art

A known electro-optical device, such as a light transmissive liquid crystal device is configured so that liquid crystal is interposed between a first substrate and a second substrate, which are formed of a glass substrate, a crystal substrate, a silicon substrate, or the like. Switching elements, such as thin-film transistors, and pixel electrodes are arranged on the first substrate in a matrix and an opposite electrode is arranged on the second substrate. Then, image display may be performed by changing the optical characteristics of the liquid crystal layer interposed between the first substrate and the second substrate on the basis of image signals.

In addition, an element substrate is the first substrate. The transistors are arranged on the element substrate. An opposite substrate is the second substrate. The opposite substrate is opposed to the element substrate. The element substrate and the opposite substrate are separately manufactured. The element substrate and the opposite substrate are, for example, formed so that a semiconductor thin film, an insulating thin film, and a conductive thin film, each of which has a predetermined pattern, are laminated on a crystal substrate. The element substrate and the opposite substrate each are formed by alternately performing a film deposition process and a photolithography process on each film in each of the layers.

Meanwhile, in the element substrate, a plurality of transistors that are provided in correspondence with pixel electrodes are formed at positions corresponding to crossover regions of data lines that supply image signals to the pixel electrodes and scanning lines that supply on signals to the transistors. The crossover regions are formed in a matrix in the display area of the liquid crystal device.

Here, when light enters known semiconductor layers in the transistors, specifically, channel regions of the semiconductor layers or regions of the semiconductor layers, which are electrically connected to pixel electrodes, the transistors malfunction and, therefore, there is a problem that display chrominance nonuniformity, cross-talk, and/or flicker occur in the liquid crystal device due to off leakage current and, in addition, defective display, such as a decrease in display contrast, occurs.

In consideration of the above problem, there is also a known liquid crystal device in which various thin films are laminated on an element substrate, and, of these thin films, light shielding films are provided in a layer formed below the semiconductor layers and cover the lower sides of the semiconductor layers in plan view, while other light shielding films are provided in a layer formed above the semiconductor layers and cover the upper sides of the semiconductor layers in plan view, thus making it possible to prevent light from entering the semiconductor layers.

For example, the scanning lines serve as light shielding films that cover the lower sides of the semiconductor layers in plan view, and the data lines and capacitor lines that hold voltages of the pixel electrodes serve as light shielding films that cover the upper sides of the semiconductor layers in plan view.

In addition, a known configuration in which, in the opposite substrate as well, in the display area, light shielding films are formed around each of the pixels in a stripe or in a matrix, which is described, for example, in Japanese Unexamined Patent Application Publication No. 2003-121879. The light shielding films, which are formed on the opposite substrate in a matrix, as described in JP-A-2003-121879, when the opposite substrate is bonded to the element substrate, are positioned so as to overlap the scanning lines and the data lines, which are formed on the element substrate in a matrix, as viewed in plan, so that the light shielding films, in cooperation with the light shielding films formed on the element substrate, prevent light from entering the transistors.

The opposite substrate, on which thin films have been laminated, is adsorbed by an adsorption head of a robot, or the like, and bonded through a seal material to the element substrate on which thin films have been laminated, with high accuracy of position.

Specifically, in order to shield light from entering the transistors by the light shielding films as well, the light shielding films, which are formed on the opposite substrate in a matrix, are bonded to the scanning lines and the data lines, which are formed on the element substrate in a matrix, in such a manner that the light shielding films overlap the scanning lines and the data lines with high positional accuracy.

However, it is difficult to bond the opposite substrate to the element substrate with completely high positional accuracy. In addition, even when the opposite substrate is bonded to the element substrate with high positional accuracy, when warpage, or the like, occurs in the element substrate or in the opposite substrate, the position of the opposite substrate may be deviated relative to the element substrate.

Furthermore, in recent years, in order to improve aperture ratio of each pixel, the widths of the light shielding films formed on each of the element substrate and the opposite substrate are made narrow to about 1.5 micrometers as compared to for example, about 2.5 to 3 micrometers in the existing art.

Thus, when the opposite substrate is bonded to the element substrate but the position of the opposite substrate is deviated relative to the element substrate, that is, when a positional deviation error of, for example, about plus or minus 0.5 to 0.7 occurs as a result of bonding of the substrates, the light shielding films formed on the opposite substrate in a matrix protrude into the light transmission regions in the display area. Thus, there has been a problem that the pixel aperture ratio varies among liquid crystal devices. In addition, there also has been a problem that the aperture ratio varies among pixels, in which some of the pixels ensure aperture ratios but other pixels have considerably decreased aperture ratios.

SUMMARY

An advantage of some embodiments of the invention is that it provides an electro-optical device and an electronic apparatus that are able to suppress defective display by reliably shielding light from entering transistors formed on a first substrate, while reducing variation in aperture ratio among pixels in the display area by using light shielding films formed on a second substrate and also preventing variation in pixel aperture ratio among liquid crystal devices, even when a positional deviation of the second substrate occurs relative to the first substrate in a bonding process.

One embodiment of the invention provides an electro-optical device having a pair of first substrate and second substrate that are opposed to each other. The electro-optical device includes scanning lines, data lines and semiconductor layers of transistors, and island light shielding films. The scanning lines, the data lines and the semiconductor layers are formed on the first substrate. The scanning lines and the data lines are formed so as to intersect with each other at crossover regions in a matrix. Each of the semiconductor layers is provided in a corresponding one of the crossover regions of the scanning lines and the data lines. Each of the island light shielding films is formed on the second substrate and at least partially overlaps the semiconductor layer in plan view. Each of the island light shielding films shields light from entering the corresponding transistor.

According to this embodiment of the invention, each of the island light shielding films is provided on the second substrate so as to at least partially overlap the corresponding semiconductor layer formed on the first substrate in plan view after a bonding process. Thus, even when the second substrate is bonded to the first substrate with poor positional accuracy, that is, even when a positional deviation occurs, the island light shielding films, which slightly protrude into the light transmission regions of the pixels, reduce variation in aperture ratio among pixels in the display area of the electro-optical device and also prevent variation in pixel aperture ratio among liquid crystal devices. Hence, it is possible to provide an electro-optical device that is able to suppress defective display by reliably shielding light from entering the transistors formed on the first substrate.

Each of the semiconductor layers may be provided in the crossover region along a direction in which the data line extends, and each of the island light shielding films may be formed along the direction in which the data line extends.

According to the above embodiment of the invention, even when the second substrate is bonded to the first substrate with poor positional accuracy, that is, even when a positional deviation occurs, the island light shielding films, which slightly protrude into the light transmission regions of the pixels, reduce variation in aperture ratio among pixels in the display area of the electro-optical device and also prevent variation in pixel aperture ratio among liquid crystal devices. Hence, it is possible to provide an electro-optical device that is able to suppress defective display by reliably shielding light from entering the semiconductor layers of the corresponding transistors formed on the first substrate.

Furthermore, each of the semiconductor layers may be provided with a channel region. The electro-optical device may further include gate insulating films and gate electrodes. Each of the gate electrodes is provided in a layer above the channel region in the crossover region and formed along a direction in which the scanning line extends. Each of the gate electrodes is electrically connected to the scanning line through the corresponding gate insulating film that covers the semiconductor layer in plan view. Each of the island light shielding films may be provided with a protruding portion that is formed in the crossover region so as to protrude in a direction in which the scanning line extends and at least partially overlap the corresponding gate electrode in plan view.

According to the above embodiment of the invention, each of the island light shielding films has the protruding portion that protrudes in the direction in which the scanning line extends so as to at least partially overlap the corresponding gate electrode of the transistor. Thus even when the second substrate is bonded to the first substrate with poor positional accuracy, that is, even when a positional deviation occurs, the protruding portions, which slightly protrude into the light transmission regions of the pixels, reduce variation in aperture ratio among pixels in the display area of the electro-optical device and also prevent variation in pixel aperture ratio among liquid crystal devices. Hence, it is possible to provide an electro-optical device that is able to suppress defective display by reliably shielding light in the crossover regions from entering the gate electrodes that extend in the direction in which the scanning line extends.

The width of each protruding portion may be different from the line width of each scanning line.

According to the above embodiment of the invention, when the width of each protruding portion is larger than the line width of each scanning line, even when the second substrate is bonded to the first substrate with poor positional accuracy, that is, even when a positional deviation occurs, the protruding portions still overlap the gate electrodes. Thus, it is possible to reliably shield light in the crossover region from entering the gate electrodes that extend in the direction which the scanning line extends. On the other hand, when the width of each protruding portion is smaller than the line width of each scanning line, even when the second substrate is bonded to the first substrate with poor positional accuracy, the protruding portions that hardly protrude into the light transmission regions reliably reduce variation in aperture ratio among pixels in the display area of the electro-optical device. Thus, it is possible to prevent variation in pixel aperture ratio among liquid crystal devices. Accordingly, it is possible to suppress defective display of the electro-optical device.

Furthermore, each of the scanning lines may serve as a second light shielding film that is formed on the first substrate and different from the island light shielding film, wherein each of the second light shielding films shields light from entering the corresponding transistor.

According to the above embodiment of the invention, when the width of each protruding portion is larger than the line width of each second light shielding film formed on the first substrate, even when the second substrate is bonded to the first substrate with poor positional accuracy, that is, even when a positional deviation occurs, the protruding portions still overlap the gate electrodes. Thus, it is possible to reliably shield light in the crossover region from entering the gate electrodes that extend in the direction in which the scanning line extends. On the other hand, when the width of each protruding portion is smaller than the line width of each second light shielding film formed on the first substrate, even when the second substrate is bonded to the first substrate with poor positional accuracy, the protruding portions that hardly protrude into the light transmission regions reliably reduce variation in aperture ratio among pixels in the display area of the electro-optical device. Thus, it is possible to prevent variation in pixel aperture ratio among liquid crystal devices. Accordingly, it is possible to suppress defective display of the electro-optical device.

Each of the island light shielding films may be formed into a rectangular shape.

According to the above embodiment of the invention, each of the island light shielding films is formed into a rectangular shape. Thus, even when the second substrate is bonded to the first substrate with poor positional accuracy, that is, even when a positional deviation occurs, the rectangular island light shielding films reduce variation in aperture ratio among pixels in the display area of the electro-optical device and also prevent variation in pixel aperture ratio among liquid crystal devices. Hence, it is possible to provide an electro-optical device that is able to suppress defective display by reliably shielding light from entering the semiconductor layers.

Further, the electro-optical device may further include capacitor lines. The capacitor lines are provided on the first substrate and formed along the corresponding data lines. One electrode of each capacitor line is electrically connected to a fixed potential. Each set of the capacitor line and the data line may serve as a third light shielding film that is formed on the first substrate and different from the island light shielding film, wherein each of the third light shielding films shields light from entering the corresponding transistor.

In addition, the width of each island light shielding film may be different from the line width of each data line and the line width of each capacitor line.

According to the above embodiment of the invention, when the width of each island light shielding film is larger than the line width of each third light shielding film formed on the first substrate, even when the second substrate is bonded to the first substrate with poor positional accuracy, that is, even when a positional deviation occurs, the island light shielding films still overlap the corresponding semiconductor layers and the corresponding gate electrodes. Thus, it is possible to reliably shield light from entering the corresponding semiconductor layers and the corresponding gate electrodes. On the other hand, when the width of each island light shielding film is smaller than the line width of each third light shielding film formed on the first substrate, even when the second substrate is bonded to the first substrate with poor positional accuracy, the island light shielding films that hardly protrude into the light transmission regions, reliably reduce variation in aperture ratio among pixels in the display area of the electro-optical device. Thus, it is possible to prevent variation in pixel aperture ratio among liquid crystal devices. Accordingly, it is possible to suppress defective display of the electro-optical device.

A second embodiment of the invention provides an electronic apparatus that includes an electro-optical device having a pair of first substrate and second substrate that are opposed to each other. The electro-optical device includes scanning lines, data lines and semiconductor layers of transistors, and island light shielding films. The scanning lines, the data lines and the semiconductor layers are formed on the first substrate. The scanning lines and the data lines are formed so as to intersect with each other at crossover regions in a matrix. Each of the semiconductor layers is provided in a corresponding one of the crossover regions of the scanning lines and the data lines. Each of the island light shielding films is formed on the second substrate and at least partially overlaps the semiconductor layer in plan view. Each of the island light shielding films shields light from entering the corresponding transistor.

According to the second embodiment of the invention, the island light shielding films are provided on the second substrate to at least partially overlap the semiconductor layers formed on the first substrate in plan view after a bonding process. Thus, even when the second substrate is bonded to the first substrate with poor positional accuracy, that is, even when a positional deviation occurs, the island light shielding films which slightly protrude into the light transmission regions of the pixels, reduce variation in aperture ratio among pixels in the display area of the electro-optical device and also prevent variation in pixel aperture ratio among liquid crystal devices. Hence, it is possible to provide an electronic apparatus provided with an electro-optical device that is able to suppress defective display by reliably shielding light from entering the corresponding transistors formed on the first substrate.

A third embodiment of the invention provides an electro-optical device having a pair of first substrate and second substrate that are opposed to each other. The electro-optical device includes data lines, transistors, lower side light shielding films and island light shielding films. The data lines are formed on the first substrate. Each of the transistors is electrically connected to the data line. Each of the transistors includes a semiconductor layer. The semiconductor layer includes a channel region, a first source/drain region, a first LDD region adjacent to the first source/drain region, a second source/drain region, and a second LDD region adjacent to the second source/drain region. Each of the lower side light shielding films is formed in a layer below the semiconductor layer. Each of the lower side light shielding films shields light from entering the corresponding first LDD region from below. The island light shielding films are formed on the second substrate. Each of the island light shielding films covers the corresponding first LDD region from above.

According to the third embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. The island light shielding films in cooperation with the lower side light shielding films reliably shield light from entering the corresponding first LDD regions formed on the first substrate. Thus, it is possible to provide an electro-optical device that is able to suppress defective display.

Furthermore, the electro-optical device may further include scanning lines that intersect with the data lines, and each of the lower side light shielding films may be formed to overlap a corresponding one of the scanning lines in plan view.

According to the above embodiment of the invention, even when the second substrate is bonded to the first substrate with poor positional accuracy; that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. The island light shielding films, in cooperation with the lower side light shielding films that overlap the scanning lines in plan view, reliably shield light from entering the corresponding first LDD regions formed on the first substrate. Thus, it is possible to provide an electro-optical device that is able to suppress defective display.

In addition, the lower side light shielding films may be the scanning lines.

According to the above embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. The island light shielding films in cooperation with the scanning lines reliably shield light from entering the corresponding first LDD regions formed on the first substrate. Thus, it is possible to provide an electro-optical device that is able to suppress defective display.

Moreover, the electro-optical device may further include pixel electrodes. The pixel electrodes are provided in a matrix in plan view. Each of the pixel electrodes is provided on the first substrate in each of the transistors and formed in a layer above the transistors. Each of the pixel electrodes applies driving voltage to electrooptic material that is held between the first substrate and the second substrate. Each of the first source/drain regions may be electrically connected to the corresponding pixel electrode, and each of the second source/drain regions may be electrically connected to the corresponding date line.

According to the above embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ration among pixels in the display are of the electro-optical device and also prevent variation in pixel aperture ration among liquid crystal devices. In addition, the island light shielding films in cooperation with the lower side light shielding films reliably shield light from entering the corresponding LDD regions, which are LDD regions adjacent to the first source/drain regions that are electrically connected to the pixel electrodes, in the semiconductor layers formed on the first substrate. Thus, it is possible to provide an electro-optical device that is able to suppress defective display.

Furthermore, each of the lower side light shielding films and each of the island light shielding films both may include two projecting portions that project in the direction in which the data line extends in plan view. The projecting portions that project toward the first source/drain region in the direction in which the data line extends are wider in plan view than the projecting portions that project toward the second source/drain region in the direction in which the data line extends.

According to the above embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. In addition, as viewed in plan, the projecting portions, which project toward the corresponding first source/drain regions and which are wider than the projecting portions that project toward the second source/drain regions in the direction in which the data line extends in the island light shielding films, reliably shield light from entering the corresponding first LDD regions that are positioned adjacent to the first source/drain regions and formed on the first substrate, in cooperation with the lower side light shielding films. Thus, it is possible to provide an electro-optical device that is able to suppress defective display.

Further, each of the lower side light shielding films and each of the island light shielding films may be formed to at least partially overlap the corresponding channel region of the semiconductor layer in plan view.

According to the above embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. In addition, as viewed in plan, the projecting portions, which project toward the first source/drain regions and which are wider than the projecting portions that project toward the second source/drain regions in the direction in which the data line extends in the island light shielding films, reliably shield light from entering the corresponding channel regions in addition to the first LDD regions. Light is reliably shielded from entering the channel regions and the first LDD regions that are positioned adjacent to the first source/drain regions formed on the first substrate in cooperation with the lower side light shielding films. Thus, it is possible to provide an electro-optical device that is able to suppress defective display.

Moreover, the electro-optical device may further include scanning lines and first contact holes. The scanning lines intersect with the data lines. Each of the first contact holes is formed to have a first elongated portion and a second elongated portion. The first elongated portion extends on both sides of the corresponding semiconductor layer in a direction in which the scanning line extends in plan view. The second elongated portion extends in the direction in which then data line extends toward the first source/drain region. Each of the first contact holes may be used to electrically connect the scanning line to a gate electrode of the corresponding transistor provided in a layer above the channel region of the semiconductor layer. Each of the lower side light shielding films and each of the island light shielding films may be formed to at least partially overlap the corresponding second elongated portion of the first contact hole in plan view.

According to the above embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. In addition, as viewed in plan, the projecting portions, which project toward the first source/drain regions and which are wider than the projecting portions that project toward the second source/drain regions in the direction in which the data line extends in each of the island light shielding films, reliably shielded light from entering the corresponding second elongated portions of the first contact holes in addition to the channel regions and the first LDD regions. Light is reliably shielded from entering the first LDD regions that are positioned adjacent to the first source/drain regions formed on the first substrate in cooperation with the lower side light shielding films. Thus, it is possible to provide an electro-optical device that is able to suppress defective display.

Further, the electro-optical device may further include second contact holes. Each of the second contact holes is formed in the corresponding first source/drain region and used to electrically connect the first source/drain region to the pixel electrode. Each of the lower side light shielding films and each of the island light shielding films may be formed to at least overlap the corresponding second contact hole in plan view.

According to the above embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. In addition, as viewed in plan, the projecting portions, which project toward the first source/drain regions and which are wider than the projecting portions that project toward the second source/drain regions in the direction in which the data line extends in the island light shielding films, reliably shield light from entering the corresponding second contact holes formed in the first source/drain regions, in addition to the first LDD regions, the second elongated portions of the first contact holes and the channel regions. Light is reliably shielded from entering the first LDD regions that are positioned adjacent to the first source/drain regions formed on the first substrate, the channel regions and the first source/drain regions in cooperation with the lower side light shielding films. Thus, it is possible to provide an electro-optical device that is able to suppress defective display.

Furthermore, each of the lower side light shielding films and each of the island light shielding films may be formed to at least partially overlap the corresponding second LDD region.

According to the above embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. In addition, as viewed in plan, the projecting portions, which project toward the first source/drain regions and which are wider than the projecting portions that project toward the second source/drain regions in the direction in which the data line extends in the island light shielding films, reliably shield light from entering the corresponding second LDD regions in addition to the first LDD regions, the second elongated portions of the first contact holes, the channel regions and the second contact holes. Light is reliably shielded from entering the second LDD regions that are positioned adjacent to the second source/drain regions in addition to the first LDD regions that are positioned adjacent to the first source/drain regions formed on the first substrate, the channel regions and the first source/drain regions in cooperation with the lower side light shielding films. Thus, it is possible to provide an electro-optical device that is able to suppress defective display.

A fourth embodiment of the invention provides an electrons apparatus that includes an electro-optical device having a pair of first substrate and second substrate that are opposed to each other. The electro-optical device includes data lines, transistors, lower side light shielding films and island light shielding films. The data lines are formed on the first substrate. Each of the transistors is electrically connected to the data line. Each of the transistors includes a semiconductor layer. The semiconductor layer includes a channel region, a first source/drain region, a first LDD region adjacent to the first source/drain region, a second source/drain region, and a second LDD region adjacent to the second source/drain region. Each of the lower side light shielding films is formed in a layer below the semiconductor layer. Each of the lower side light shielding films shields light from entering the corresponding first LDD region from below. The island light shielding films are formed on the second substrate. Each of the island light shielding films covers the corresponding first LDD region from above.

According to the fourth embodiment of the invention, even when the second substrate is bonded to the first substrate with poor positional accuracy, that is, even when a positional deviation occurs, the island light shielding films, which slightly protrude into the light transmission regions of the pixels, are able to reduce variation in aperture ratio among pixels in the display area of the electro-optical device and also prevent variation in pixel aperture ratio among liquid crystal devices. The island light shielding films in cooperation with the lower side light shielding films reliably shield light from entering the corresponding first LDD regions formed on the first substrate. Thus, it is possible to provide an electronic apparatus that is provided with an electro-optical device that is able to suppress defective display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the accompanying drawings. Note, that in the following embodiments, an electro-optical device will be described by taking a light transmissive liquid crystal device for example. In addition, among a pair of first and second substrates that are opposed to each other in the liquid crystal device, the first substrate will be described by taking an element substrate (hereinafter, referred to as a TFT substrate) for example, and the second substrate will be described by taking an opposite substrate that is opposed to the TFT substrate for example.

First Embodiment

Figure 1:
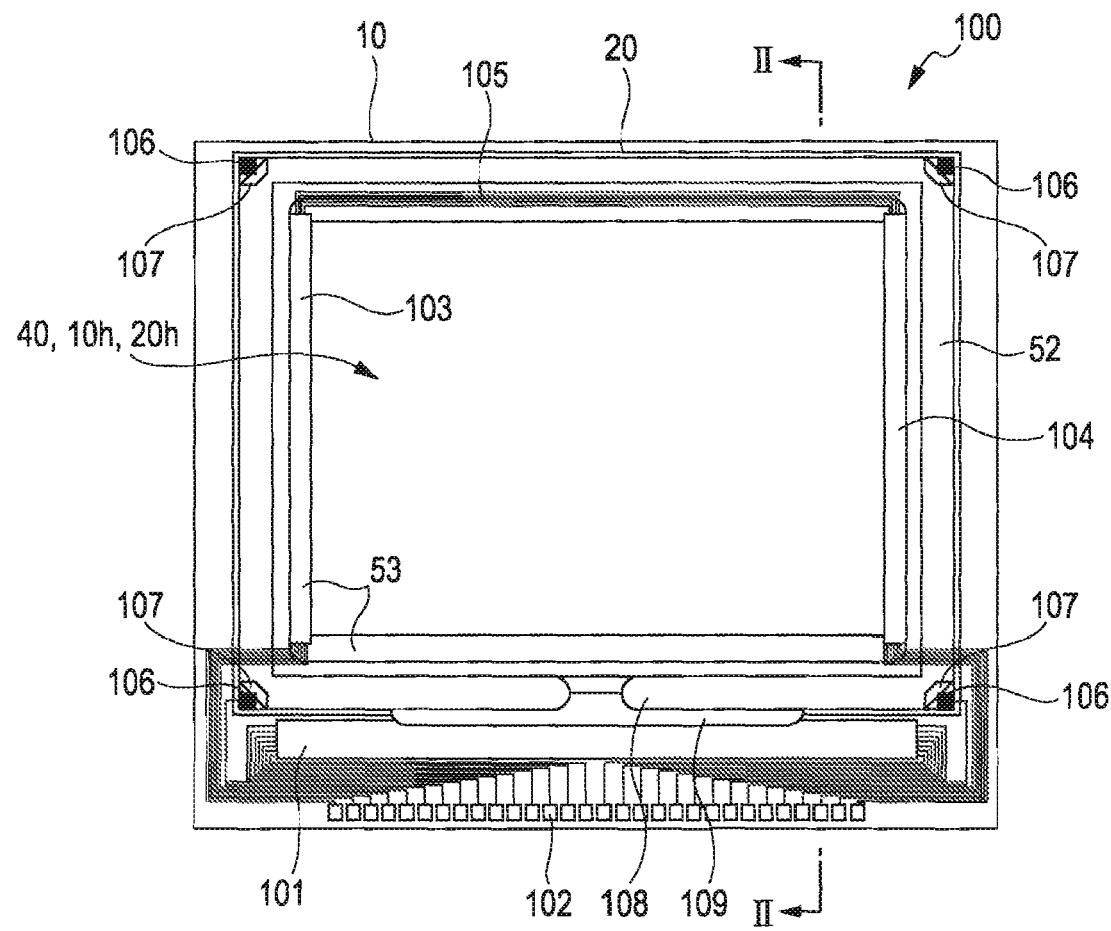
FIG. 1 is a plan view of a liquid crystal device according to a first embodiment of the invention.
Figure 2:
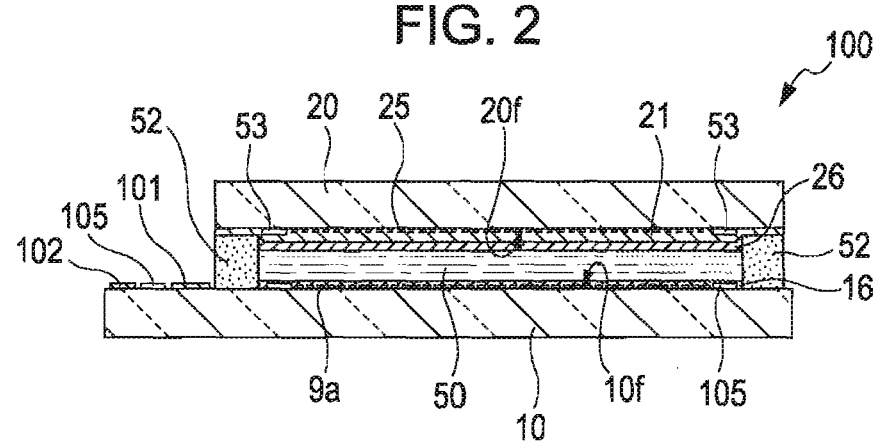
FIG. 2 is a cross-sectional view that is taken along the line II-II in FIG. 1.

FIG. 1 is a plan view of a liquid crystal device according to the present embodiment. FIG. 2 is a cross-sectional view that is taken along line II-II in FIG. 1.

As shown in FIG. 1 and FIG. 2, a liquid crystal device 100, for example, includes a TFT substrate 10, an opposite substrate 20, and a liquid crystal 50. The TFT substrate 10 is formed of, for example, a crystal substrate, a glass substrate, or a silicon substrate. The opposite substrate 20 is opposed to the TFT substrate 10 and is formed of, for example, a glass substrate, a crystal substrate, or a silicon substrate. The liquid crystal 50, which is a electrooptic material, is interposed in a space between the TFT substrate 10 and the opposite substrate 20. The TFT substrate 10 and the opposite substrate 20, which are opposed to each other, are bonded by a seal material 52.

Figure 3:
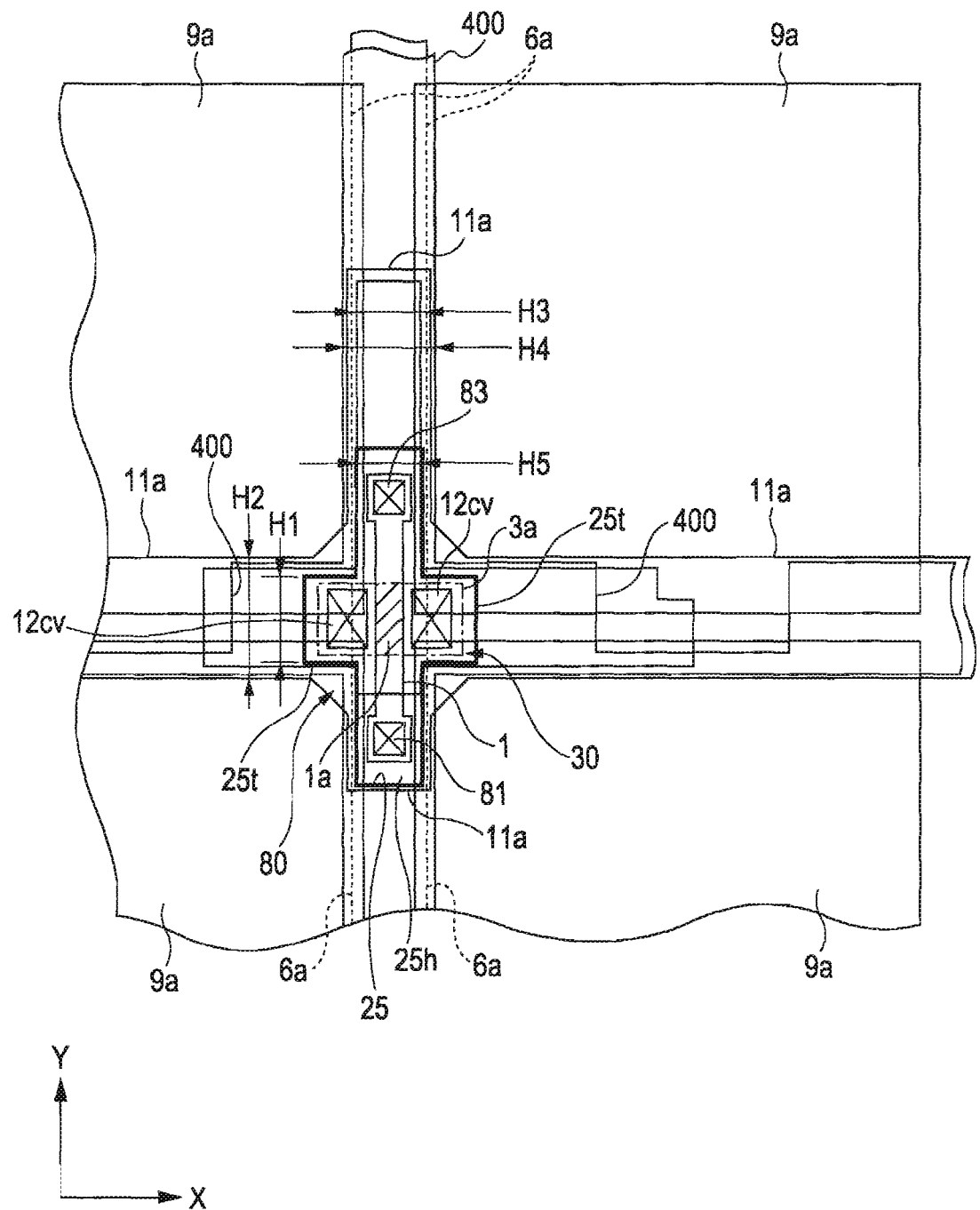
FIG. 3 is a partial plan view showing portion of a deposition pattern that is laminated on a TFT substrate shown in FIG. 1 and arrangement of one of BMs formed on an opposite substrate.

A display area 10h of the TFT substrate 10 which forms a display area 40 of the liquid crystal device 100 is formed on a surface 10f of the TFT substrate 10, which is in contact with the liquid crystal 50. In addition, pixels are formed in the display area 10h and pixel electrodes (ITO) 9a, which apply driving voltage to the liquid crystal 50 with an opposite electrode 21, which will be described later, are arranged in a matrix as shown in FIG. 3, which will be described later.

An alignment layer 16, which has been treated with a rubbing process, is provided on the pixel electrodes 9a formed on the TFT substrate 10. Note that the alignment layer 16 is, for example, formed of a transparent organic layer, such as a polyimide layer.

In addition, in the display area 10h of the TFT substrate 10, a plurality of scanning lines 11a (see FIG. 3) and a plurality of data lines 6a (see FIG. 3) are arranged in a matrix so that they are intersect with each other. Each of the scanning lines supplies a signal to turn on/off corresponding gate electrodes 3a, which will be described later. Each of the data lines 6a supplies an image signal to the pixel electrodes 9a. The pixel electrodes 9a are arranged in a matrix at positions corresponding to regions which are defined by the scanning lines 11a and the data lines 6a.

Then, thin-film transistors (hereinafter, referred to as TFTs) 30, which are switching elements, are provided at positions corresponding to crossover regions 80 (see FIG. 3) of the plurality of scanning lines 11a and the plurality of data lines 6a. Each of the pixel electrodes 9a is connected to the corresponding TFT 30.

Each of the TFTs 30 includes a semiconductor layer 1 (see FIG. 3), the gate electrode 3a (see FIG. 3), and a gate insulating film (not shown). The semiconductor layer 1 is, for example, formed of a crystallized silicon film such as a polysilicon film. The gate electrode 3a is electrically connected to the scanning line 11a through a contact hole 12cv (see FIG. 3). The gate insulating film covers the semiconductor layer 1 in plan view and thereby electrically insulates the gate electrode 3a from the semiconductor layer 1.

The semiconductor layer 1 includes a channel region 1a, a source region (not shown), and a drain region (not shown). The source region is electrically connected to the data line 6a through a contact hole 81 (see FIG. 3). The drain region is electrically connected to a storage capacitor, which will be described later, through a contact hole 83 (see FIG. 3).

Note that the scanning line 11a covers the semiconductor layer 1 of the TFT 30 in plan view to serve as a light shielding film that is formed on the TFT substrate 10 so as to shield light from entering the TFT 30 from below. In addition the data line 6a covers the semiconductor layer 1 of the TFT 30 in plan view to serve as a light shielding film that is formed on the TFT substrate 10 so as to shield light from entering TFT 30 from above. Note that the TFT substrate 10 may be provided with another light shielding film that shields light from entering the TFT 30 from below, in addition to the scanning line 11a.

The gate electrode 3a of the TFT 30 turns on the channel region 1a in response to an on signal supplied through the scanning line 11a and, as a result, an image signal supplied through the data line 6a to the pixel electrode 9a. A voltage between the pixel electrode 9a and the opposite electrode 21 that is provided on the opposite substrate 20 is applied to the liquid crystal 50.

Although not shown in the drawing, the storage capacitor is provided in parallel with the pixel electrode 9a. Note that the storage capacitor is electrically connected through the contact hole 83 (see FIG. 3) to the drain region of the semiconductor layer 1.

The storage capacitor serves as capacitor, one electrode of which is electrically connected to a fixed potential and the other electrode of which is electrically connected to the pixel electrode 9a. The storage capacitor enables extending holding time of a voltage applied to the liquid crystal 50. For example, the storage capacitor makes it possible to hold a voltage three-digit time longer than the time during which an image signal is being supplied to the pixel electrode 9a.

Furthermore, a capacitor line 400 (see FIG. 3) is provided in parallel with the pixel electrode 9a. The capacitor line 400 also serves as a capacitor, one electrode of which is electrically connected to a fixed potential and the other electrode of which is electrically connected to the pixel electrode 9a. The capacitor line 400 holds a voltage applied to the pixel electrode 9a.

Note that the capacitor electrodes and the capacitor lines 400 also serve as a light shielding film formed on the TFT substrate 10 so as to shield light from entering the TFT 30 from above so that the capacitor electrode and the capacitor line 400 cover the semiconductor layer 1 of the TFT 30 in plan view.

In a region around each of the pixels in the display area 20h, which will be described later, on a surface 20f of the opposite substrate 20, island light shielding films (hereinafter, referred to as BMs) 25 made of, for example, aluminum, chromium, or the like, are provided at positions corresponding to the crossover regions 80 of the scanning lines 11a and the data lines 6a. Each of then BMs 25 shields light from entering the corresponding TFT 30. Note that the BMs 25 will be specifically described later with reference to FIG. 3.

The opposite electrode (ITO) 21 is provided on the BMs 25 all over the entire surface of the surface 20f and applies a driving voltage to the liquid crystal 50 in cooperation with the pixel 9a. Further, the alignment layer 26, which has been treated with a rubbing process, is provided on the opposite electrode 21. Note that the alignment layer 26 is, for example, formed of a transparent organic layer, such as polyimide layer.

In addition, the display area 20h of the opposite substrate 20, which forms the display area 40 of the liquid crystal device 100, is formed on a surface of the opposite electrode 21, which is opposite the display area of 10h of the TFT substrate 10 and is in contact with the liquid crystal 50.

Light shielding films 53 that are different from the BMs 25 are provided on the opposite substrate 20 as a window frame that specifies the display area 40 in such a manner that the outer periphery of the display area 10h of the TFT substrate 10 and the display area 20h of the opposite substrate 20 are specified and defined within a pixel region.

When the liquid crystal 50 is injected into the space between the TFT substrate 10 and the opposite substrate 20 through a know, liquid crystal injection method, the seal material 52 is applied but one of the sides of the seal material 52 surrounding the display area is partially omitted. Note that, when the liquid crystal 50 is dropped into the space between the TFT substrate 10 and the opposite substrate 20 through a known liquid crystal dropping method, the seal material 52 is applied continuously around the display area without any omitted portions of the seal material 52.

The portion where the seal material 52 is omitted (not applied) forms a liquid crystal injection port 108 for injecting the liquid crystal 50 through the omitted portion between the TFT substrate 10 and the opposite substrate 20 that are bonded to each other. The liquid crystal injection port 108 is sealed by a seal material 109 after the liquid crystal has been injected. Note that, when the liquid crystal 50 is dropped through the liquid crystal dropping method, it is unnecessary to have the liquid crystal injection port 108 and seal material 109.

A data line driving circuit 101 and external connection terminals 102 are provided along one side of the TFT substrate 10 in a region outside the seal material 52. The data line driving circuit 101 is a driver that drives data lines (not shown) formed on the TFT substrate 10 by supplying the data lines with image signals at predetermined timing. The external connection terminals 102 are used for connection with an external circuit.

Scanning line driving circuits 103, 104 are provided along two sides adjacent to the above one side. The scanning line driving circuits 103, 104 are drivers that drive the gate electrodes 3a of the TFTs 30 by supplying the scanning lines 11a and the gate electrodes 3a, which are formed on the TFT substrate 10, with scanning signals at predetermined timing. The scanning line driving circuits 103, 104 are formed on the TFT substrate 10 at positions inside the seal material 52 and opposite the light shielding films 53.

In addition, on the TFT substrate 10, the data line driving circuit 101, the scanning line driving circuits 103, 104, the external connection terminals 102 and wirings 105, which connect upper and lower conductive terminals 107, are provided opposite the light shielding films 53 arranged along the three sides of the liquid crystal device 100.

The upper and lower conductive terminals 107 are formed on the TFT substrate 10 at positions corresponding to four corners of the seal material 52. Then, upper and lower conduction materials 106 are provided between the TFT substrate 10 and the opposite substrate 20. The lower end of each of the upper and lower conduction materials 106 is in contact with the upper and lower conductive terminal 107, and the upper end thereof is in contact with the opposite electrode 21. The TFT substrate 10 and the opposite substrate 20 are electrically connected through the upper and lower conduction materials 106.

The BMs 25 formed on the opposite substrate 20 will now be described with reference to FIG. 3. FIG. 3 is a partial plan view showing portion of a deposition pattern that is laminated on a TFT substrate shown in FIG. 1 and arrangement of one of BMs formed on an opposite substrate.

As shown in FIG. 3, the semiconductor layer 1 of the TFT 30 is formed in each of the crossover regions 80 of the data lines 6a and the scanning lines 11a and formed along the data line 6a so as to extend in a Y direction, shown in FIG. 3, in which the data line 6a extends.

In addition, the gate electrode 3a of the TFT 30 is formed in each of the crossover regions 80 and formed along the scanning line 11a so as to extend in an X direction, shown in FIG. 3, in which the scanning line 11a that intersects with the data line 6a extends. Note that the scanning line 11a, as shown in FIG. 3, is formed to have a portion that projects in the direction in which the data line 6a extends.

The BM 25, as showing in FIG. 3, is patterned in each of the crossover regions 80 so as to form an island shape and at least partially overlaps the semiconductor layer of the TFT 30 in plan view.

Specifically, in each of the crossover regions 80, a body portion 25h of the BM 25 is patterned to form an elongated island shape that extends along the Y direction shown in FIG. 3. Note that the body portion 25h is larger in area than the semiconductor layer 1 in plan view.

Hereinafter, among the BMs 25 that are positioned in the plurality of corresponding crossover regions 80, the BM 25 that is positioned in one of the crossover regions 80 will be described as an example.

Because the gate electrode 3a is provided along the X direction shown in FIG. 3 in the crossover region 80, the BM 25 is patterned to form an island shape that has protruding portions 25t extending in the X direction, shown in FIG. 3, so that the protruding portions 25t at least overlap the gate electrode 3a in plan view and extend to intersect with the body portion 25h. That is, the BM 25, as shown in FIG. 3, is formed into a cross shape in plan view.

Note that the protruding portions 25t are larger in area than the gate electrode 3a in plan view. In addition, the protruding portions 25t may be formed to have an island shape so that they overlap not only the gate electrode 3a but also a region in which the capacitor line 400, which serves as a light shielding film formed on the TFT substrate 10, becomes narrow in the X directional shown in FIG. 3.

The BM 25 is arranged to at least partially overlap the semiconductor layer 1, preferably, the TFT 30, in plan view and, in cooperation with the data line 6a, the scanning line 11a, the storage capacitor and the capacitor line 400, which are formed on the TFT substrate 10, shields light from entering the TFT 30.

Note that, in each of the pixel electrodes 9a, a region that does not overlap the BMs 25, the data lines 6a, the scanning lines 11a, the storage capacitors and the capacitor lines 400, which are formed on the TFT substrate 10, in plan view is a light transmission region through which light is transmitted in each of the pixels.

In addition, the configuration of the BM 25 described above also applies to any BMs 25 that are provided in the corresponding crossover regions 80.

Figure 4:
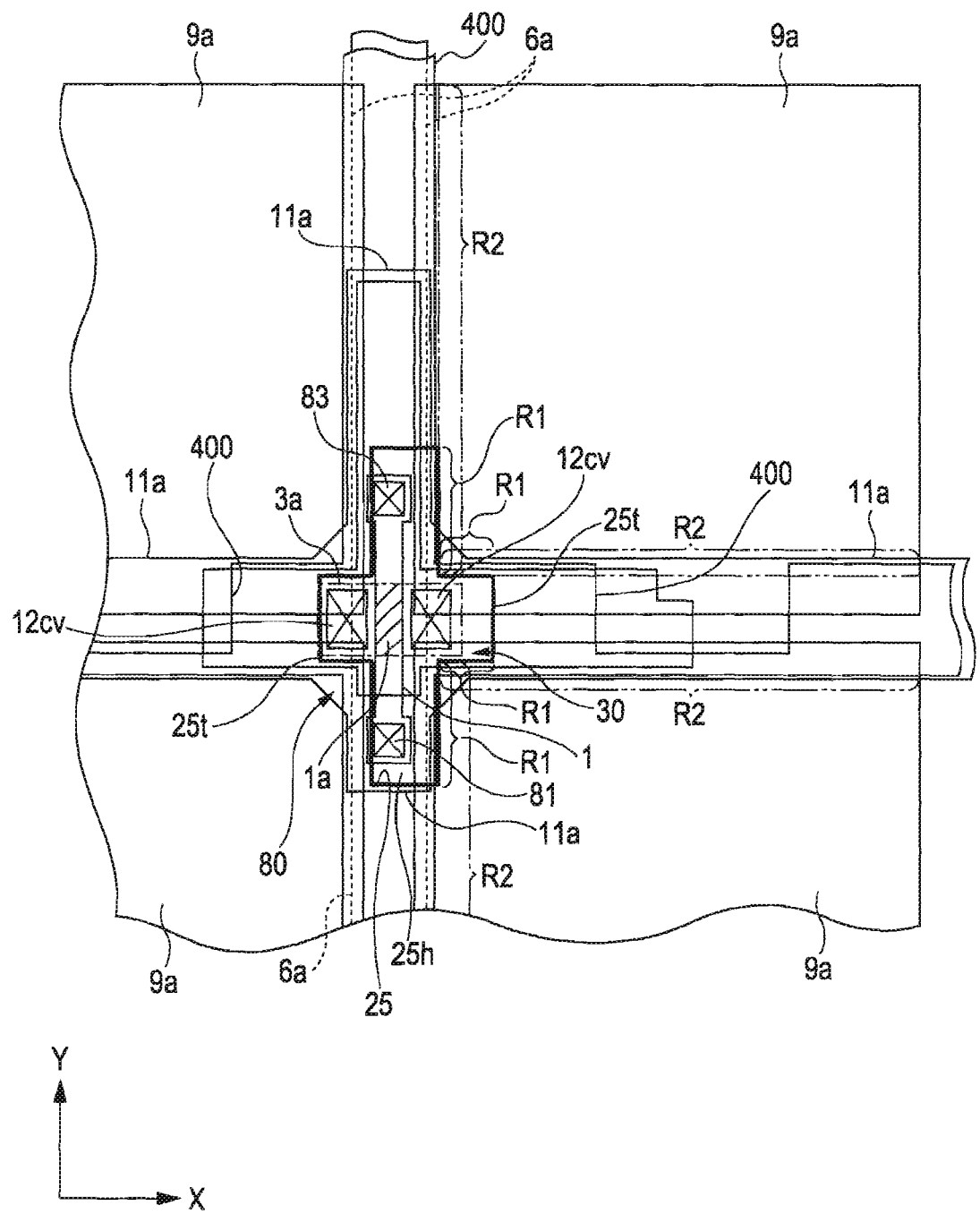
FIG. 4 is a partial plan view showing a state where the BM formed on the opposite substrate in FIG. 3 is arranged offset in an X direction and a Y direction in a crossover region, together with portion of the deposition pattern that is laminated on the TFT substrate.

The operation of the present embodiment will now be described. FIG. 4 is a partial plan view showing a state where the BM formed on the opposite substrate in FIG. 3 is arranged offset in an X direction and a Y direction in a crossover region, together with portion of the deposition pattern that is laminated on the TFT substrate. The following will describe, among the BMs 25 that are positioned in the plurality of corresponding crossover regions 80, the BM 25 that is positioned in one of the crossover regions 80 as an example.

When the opposite substrate 20 is bonded to the TFT substrate 10 so that the position of opposite substrate 20 is deviated relative to the TFT substrate 10, that is, when a positional deviation error occurs as a result of bonding, as shown in FIG. 4, the BM 25 formed on the opposite substrate 20 is positioned offset at least in the X direction or in the Y direction within the crossover region 80. As a result, the BM 25 protrudes into the light transmission region in some of the pixels. Note that FIG. 4 is a view showing a state where, when the opposite substrate 20 is bonded and positioned offset in the X direction, the body portion 25h of the BM 25, which extends in the Y direction, protrudes into the light transmission regions of two adjacent pixels that are arranged in a vertical manner in FIG. 4.

In this case, in the present embodiment, because the BM 25 is formed to have an island shape, the BM 25 less protrudes into the transmission regions of the pixels as compared to an existing BM that is formed along the scanning line 11a and the data line 6a in a matrix or in a stripe.

Specifically, as shown in FIG. 4, when the body portion 25h of the BM 25 protrudes in the Y direction only, the existing BM, which is indicated by two-dotted lines, formed along the data line 6a, protrudes into the transmission regions of the pixels by an area of a region R2, while, on the other hand, the BM 25 according to the present embodiment protrudes into the transmission regions of the pixels only by an area of a region R1 that is smaller than that of the region R2. Note that this also applies to a case where the protruding portions 25t of the BM 25 protrude into the light transmission regions of pixels.

In addition, the BM 25 is patterned in the crossover region 80 so that the body portion 25h is formed to have an elongated island shape that extends along the semiconductor layer 1 of the TFT 30 provided along the data line 6a. Thus, even when the opposite substrate 20 is bonded to the TFT substrate 10 and the position of the opposite substrate 20 is deviated relative to the TFT substrate 10, that is, even when a positional deviation error occurs as a result of bonding, the body portion 25h is positioned to overlap the semiconductor layer 1, as shown in FIG. 4, if it is a small deviation, such as a deviation of plus or minus 0.5 to 0.7 micrometers.

Furthermore, because the BM 25 is provided with the protruding portions 25t, even when the opposite substrate 20 is bonded to the TFT substrate 10 and the position of the opposite substrate 20 is deviated relative to the TFT substrate 10, that is, even when a positional deviation error occurs as a result of bonding, the protruding portions 25t are positioned to at least overlap the gate electrode 3a, as shown in FIG. 4, if it is a small deviation, such as a deviation of plus or minus 0.5 to 0.7 micrometers.

In addition, the above operation also applies to any BMs 25 provided in the corresponding crossover regions 80.

Thus, in the present embodiment, each of the BMs 25, which are formed on the opposite substrate 20 and arranged into the crossover regions 80, is patterned to form an island shape such that the body portion 25h at least partially overlaps the semiconductor layer 1 that is provided along the data line 6a in the crossover region 80 in plan view.

In addition, each of the BMs 25 has the protruding portions 25t that overlap the gate electrode 3a, which is provided along the scanning line 11a that intersects with the data line 6a, in the crossover region 80 in plan view. That is, each of the BMs 25 has a cross shape in plan view.

Accordingly, after the bonding, even when the position of the opposite substrate 20 is deviated relative to the TFT substrate 10, the region R1 in which the island BM 25 protrudes into the transmission regions of the pixels is smaller than the region R2 in which the existing matrix or stripe BM protrudes into the transmission regions of the pixels.

Thus, variation in aperture ratio among the adjacent pixels due to the opposite substrate 20 that is deviated in position relative to the TFT substrate 10 is reduced. That is, even when the aperture ratio of one of the pixels is decreased, the island BM 25 is able to suppress a decrease in aperture ratio to a minimum degree as compared to the existing matrix or stripe BM. Thus, it is possible to reduce variation in aperture ratio among pixels in the display area 40 of the liquid crystal device 100 and also possible to reduce variation in pixel aperture ratio among liquid crystal devices as compared to the existing liquid crystal device.

Further, even when the position of the opposite substrate 20 is deviated relative to the TFT substrate 10 the BM 25 is arranged to overlap the TFT 30 in plan view owing to the body portion 25h and the protruding portions 25t if it is a small deviation, such as a deviation of plus or minus 0.5 to 0.7 micrometers. Thus, it is possible to reliably shield light from entering the transistors 30.

Thus, it is possible to provide the liquid crystal device 100 that is able to suppress defective display.

Figure 5:
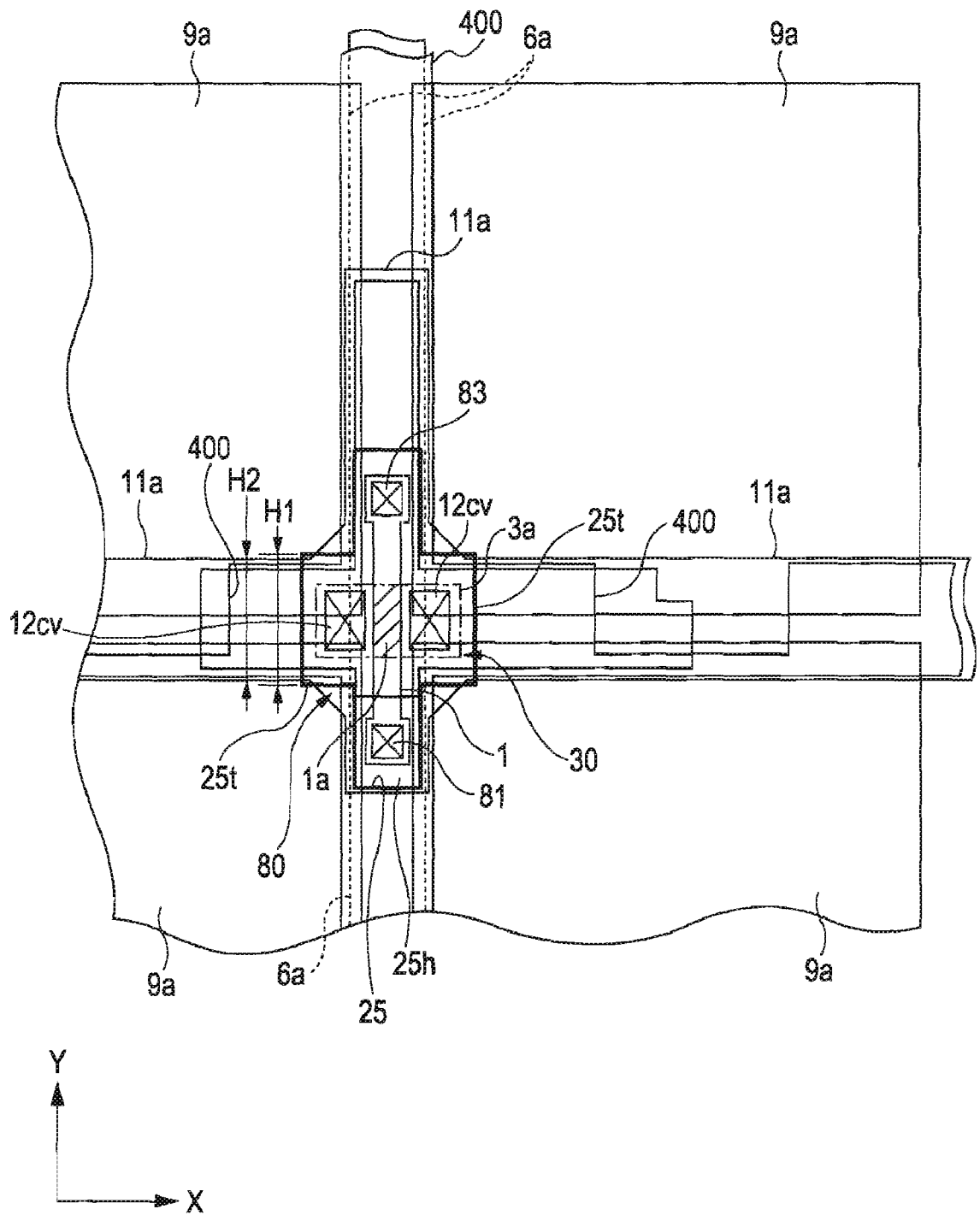
FIG. 5 is a partial plan view showing an alternative example in which the widths of protruding portions of the BM shown in FIG. 3 are larger than the line width of the scanning line, together with portion of the deposition pattern that is laminated on the TFT substrate.

An alternative example will be described with reference to FIG. 5. FIG. 5 is a partial plan view showing an alternative example in which the widths of protruding portions of the BM shown in FIG. 3 are larger than the line width of the scanning line, together with portion of the deposition pattern that is laminated on the TFT substrate.

As shown in FIG. 5, the widths H1 of the protruding portions 25t of the BM 25 in the present embodiment may be different from the line width H2 of the scanning line 11a, that is, may be larger than the line width H2.

Thus, even when the position of the opposite substrate 20 is deviated relative to the TFT substrate 10, the protruding portions 25t still overlap the gate electrode 3a in the crossover region 80. Therefore, it is possible to reliably shield light in the crossover region 80 from entering the gate electrode 3a that extends in the X direction in which the scanning line 11a is provided by using the wide protruding portions 25t. Hence, light shielding effect with respect to the gate electrode 3a is further improved in the alternative example as compared to the present embodiment.

Conversely, as in the present embodiment shown in FIG. 3, when the widths H1 of the protruding portions 25t are different from the line width H2 of the scanning line 11a, that is, smaller than the line width H2, even when the position of the opposite substrate 20 is deviated relative to the TFT substrate 10, the protruding portions 25t hardly protrude into the light transmission regions of the pixels. Thus, it is possible to reliably reduce variation in aperture ratio among pixels in the display area 40 and also possible to prevent variation in pixel aperture ratio among the liquid crystal devices.

Figure 6:
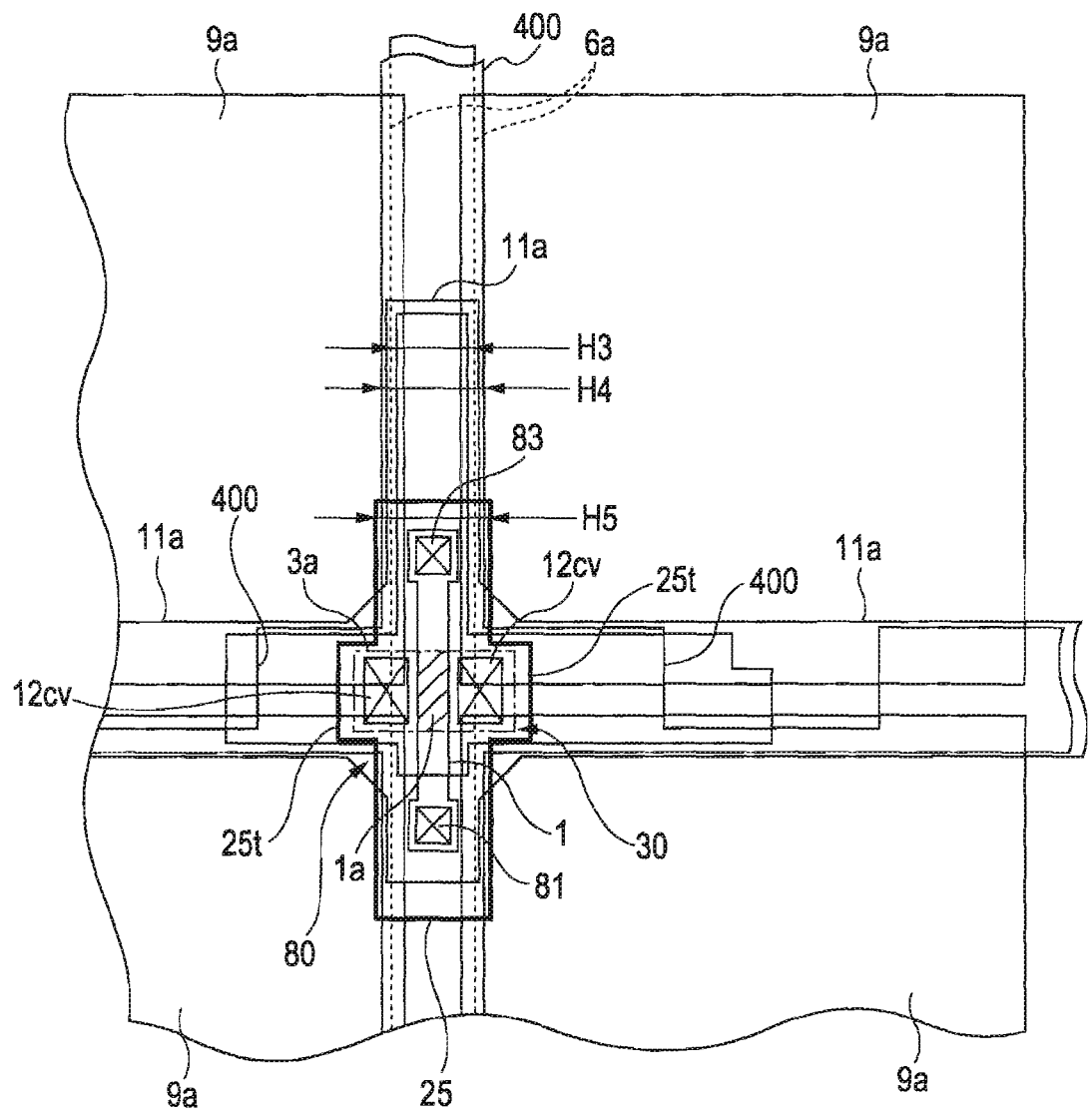
FIG. 6 is a partial plan view showing an alternative example in which the width of a body portion of the BM shown in FIG. 3 is larger than the line width of a data line and the line width of a capacitor lines together with portion of the deposition pattern that is laminated on the TFT substrate.

Another alternative example will be described with reference to FIG. 6. FIG. 6 is a partial plan view showing an alternative example in which the width of a body portion of the BM shown in FIG. 3 is larger than the line width of a data line and the line width of a capacitor line, together with portion of the deposition pattern that is laminated on the TFT substrate.

As shown in FIG. 6, the width H5 of the body portion 25h of the BM 25 in the present embodiment may be different from the line width H4 of the data line 6a and the line width H4 of the capacitor line 400, that is, may be larger than the line width H3 and the line width H4. Note that, as shown in FIG. 5, it is applicable that the widths H1 of the protruding portions are larger than the line width H2 of the scanning line 11a, and the width H5 of the body portion 25h of the BM 25 is then formed larger than the line width H3 of the data line 6a and the line width H4 of the capacitor line 400.

Thus, even when the position of the opposite substrate 20 is deviated relative to the TFT substrate 10, the body portion 25h still overlaps the semiconductor layer 1 in the crossover region 80. Therefore, it is possible to reliably shield light from entering the semiconductor layer 1 that extends in the Y direction in which the data line 6a and the capacitor line 400 are provided by using the wide body portion 25h. Hence, light shielding effect with respect to the semiconductor layer 1 is further improved in the alternative example as compared to the present embodiment.

Conversely, as in the present embodiment shown in FIG. 3, when the width H5 of the body portion 25h is different from the line width H3 of the data line 6a and the line width H4 of the capacitor line 400, that is, smaller than the line width H3 and the line width H4, even when the position of the opposite substrate 20 is deviated relative to the TFT substrate 10, the body portion 25h hardly protrudes into the light transmission regions of the pixels. Thus, it is possible to further reliably reduce variation in aperture ratio among pixels in the display area 40 and also possible to prevent variation in pixel aperture ratio among the liquid crystal devices.

Second Embodiment

Figure 7:
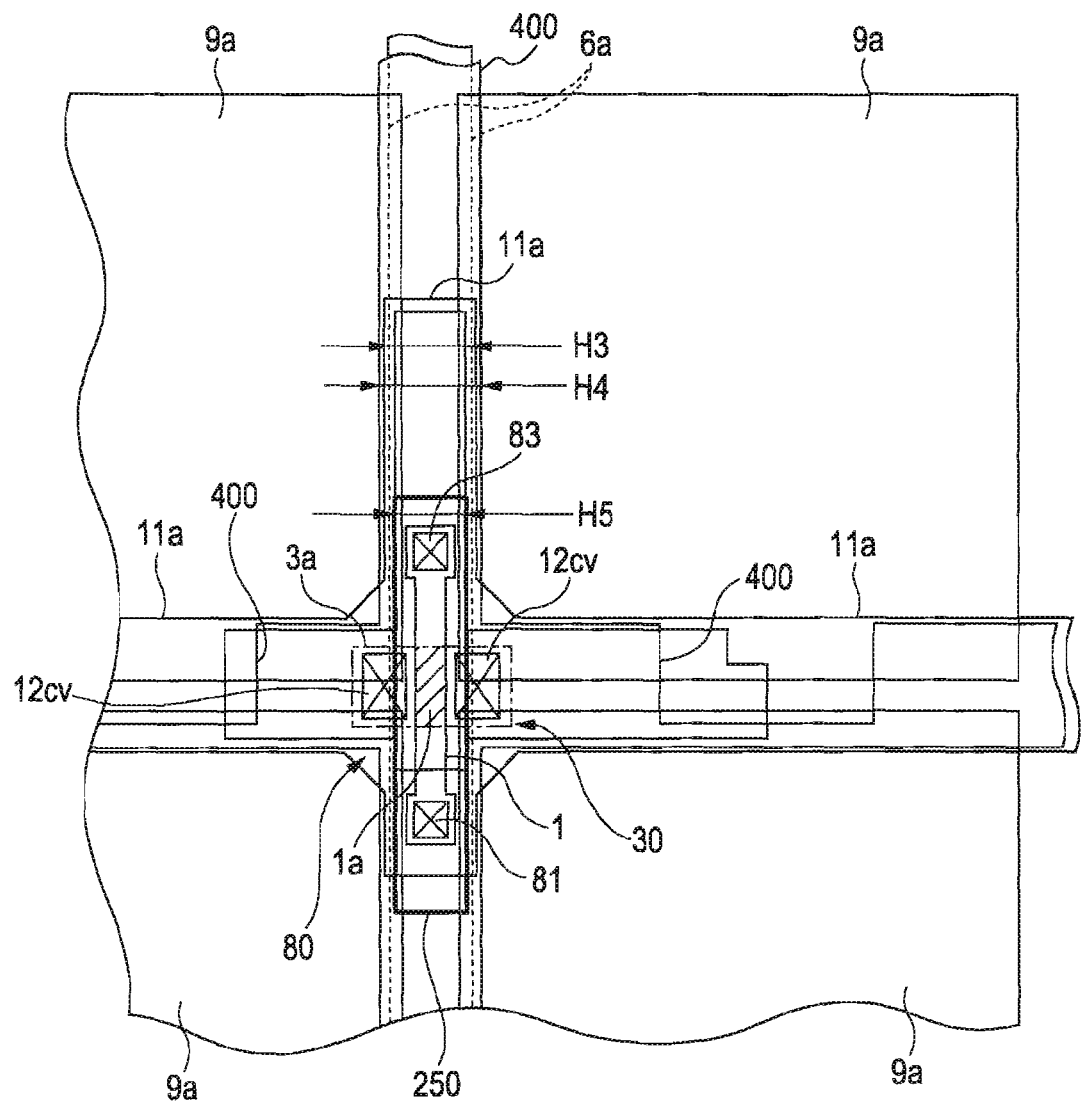
FIG. 7 is a partial plan view showing portion of a deposition pattern that is laminated on a TFT substrate and arrangement of one of BMs formed on an opposite substrate in a liquid crystal device according to a second embodiment of the invention.

FIG. 7 is a partial plan view showing portion of a deposition pattern that is laminated on a TFT substrate and arrangement of one of BMs formed on an opposite substrate in a liquid crystal device according to the present embodiment.

The configuration of the liquid crystal device according to the second embodiment is only different from the liquid crystal device 100 according to the first embodiment in that the BM is formed into a rectangular shape on the opposite substrate 20. Thus, only the difference will be described, the same reference numerals are assigned to the same or similar components as those of the liquid crystal device 100 according to the first embodiment, and a description thereof is omitted.

As shown in FIG. 7, BMs 250 each are patterned in a corresponding one of the crossover regions 80 to form a rectangular island shape that at least partially overlaps the semiconductor layer 1 of the TFT 30 in plan view.

Specifically, in each of the crossover regions 80, the semiconductor layer 1 is provided along the data line 60 in the Y direction shown in FIG. 7, so that each of the BMs 250 is patterned to form a rectangular island shape that is elongated in the Y direction shown in FIG. 7. Note that each of the BMs 250 is larger in area than that of the semiconductor layer 1 in plan view.

The following will describe, among the BMs 250 that are positioned in the plurality of crossover regions 80, the BM 250 that is positioned in one of the crossover regions 80 as an example.

The BM 250 is arranged so as to at least partially overlap the semiconductor layer 1 in plan view and, in cooperation with the data line 6a, the scanning line 11a, the storage capacitor and the capacitor line 400, which are formed on the TFT substrate 10, shields light from entering the semiconductor layer 1. In addition, the configuration of the BM 250 described above also applies to any BMs 250 that are provided in the corresponding crossover regions 80.

Thus, in the present embodiment, each of the BMs 250 is formed to have a rectangular island shape that is elongated in the Y direction shown in FIG. 7 along the semiconductor layer 1.

Accordingly, the BMs 250 do not have protruding portions as in the case of the first embodiment. Even when the position of the opposite substrate 20 is deviated relative to the TFT substrate 10 after the bonding, it is possible to reduce variation in aperture ratio among pixels in the display area 40 that would be caused by the BMs 250 protruding into the light transmission regions of some pixels in the X direction shown in FIG. 7, and also it is possible to further reduce variation in pixel aperture ratio among liquid crystal devices.

Further, even when the position of the opposite substrate 20 is deviated relative to the TFT substrate 10, the BM 250 is still arranged so as to overlap the semiconductor layer 1 in plan view if it is a small deviation, such as a deviation of plus or minus 0.5 to 0.7 micrometers. Thus, it is possible to reliably shield light from entering the semiconductor layer 1.

Thus, it is possible to provide a liquid crystal device that is able to suppress defective display.

Figure 8:
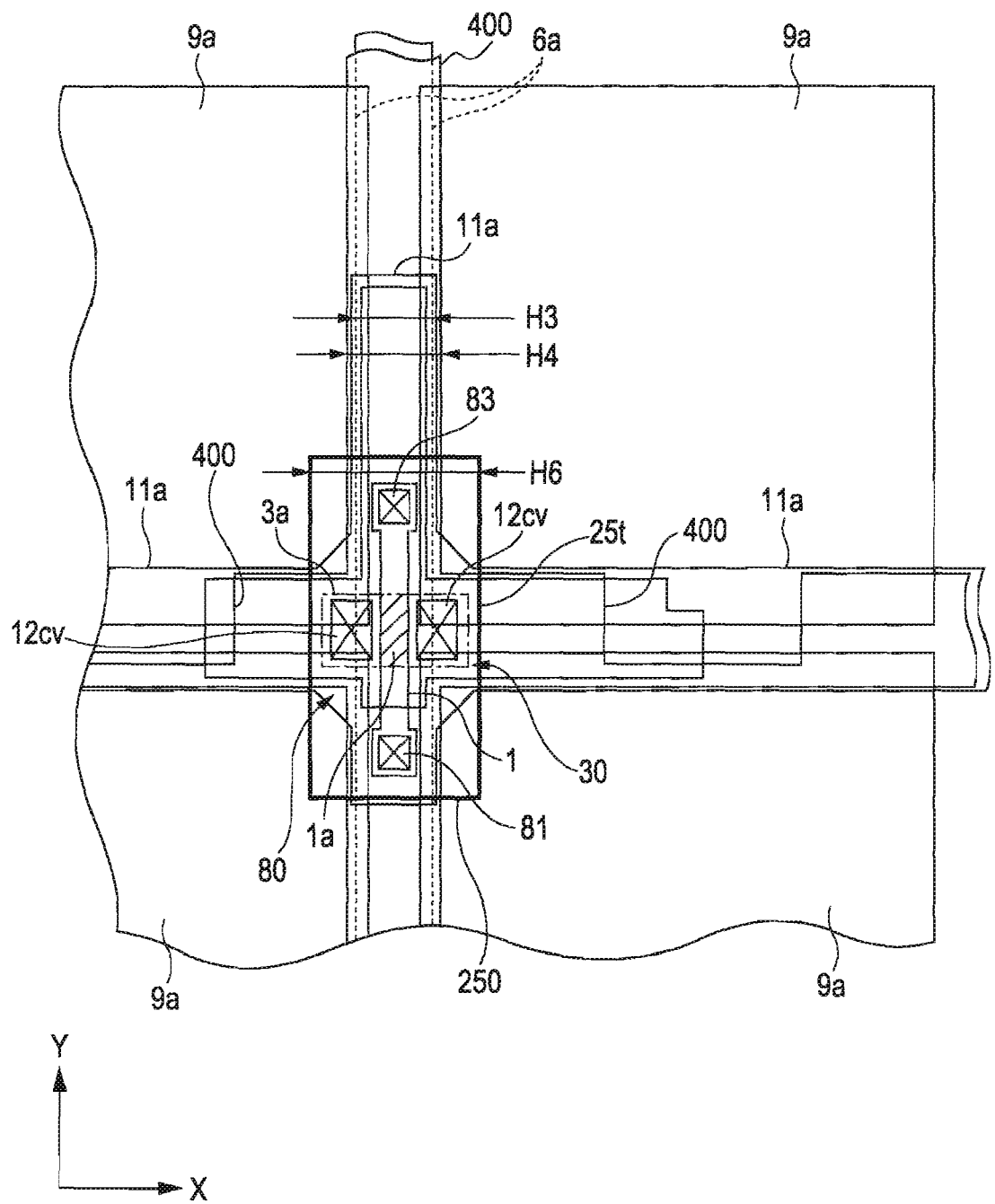
FIG. 8 is a partial plan view showing an alternative example in which the width of the BM shown in FIG. 7 in an X direction is larger than the line width of a data line and the line width of a capacitor line, together with portion of the deposition pattern that is laminated on the TFT substrate.

An alternative example will be described with reference to FIG. 8. FIG. 8 is a partial plan view of an alternative example in which the width of the BM shown in FIG. 7 in an X direction is larger than the line width of a data line and the line width of a capacitor line, together with portion of the deposition pattern that is laminated on the TFT substrate.

In the present embodiment, in FIG. 7, the line width H5 of the BM 250 in the X direction is narrower than the line width H3 of the data line 6a and the line width H4 of the capacitor line 400. However, as shown in FIG. 8, the width H6 of the BM 250 may be different from the line width H3 of the data line 6a and the line width H4 of the capacitor line 400, that is, made larger so as to overlap the gate electrode 3a in plan view.

With this configuration, even when the position of the opposite substrate 20 is deviated relative to the TFT substrate 10 after the bonding, the BM 250 is arranged so as to overlap not only the semiconductor layer 1 but also the gate electrode 3a in plan view if it is a small deviation, such as a deviation of plus or minus 0.5 to 0.7 micrometers. Thus, it is possible to provide a liquid crystal device that is able to reliably shield light from entering not only the semiconductor layer 1 but also the gate electrode 3a, which cannot be prevented by the configuration described in the present embodiment.

In addition, when the width of the BM 250 is larger than the line width H3 of the data line 6a and the line width H4 of the capacitor line 400, the BM 250 protrudes into the light transmission regions of the adjacent left and right pixels as shown in FIG. 8 in a state where the opposite substrate 20 is appropriately bonded in position relative to the TFT substrate 10.

However, when the position of the opposite substrate 20 is deviated relative to the TFT substrate 10 after the bonding, one of the above adjacent pixels has a decreased aperture ratio of the pixel because the BM 250 protrudes into the pixel by a large amount, while, on the other hand, the other one of the adjacent pixels has an increased aperture ratio of the pixel because the BM 250 reduces protrusion into the pixel by an amount the BM 250 protrudes into the one of the adjacent pixels.

That is, when the entire pixels in the display area 40 are taken into consideration, the aperture ratio of the pixels as a whole remains unchanged. Thus, it is possible to provide a liquid crystal device that reduces variation in aperture ratio among pixels and that prevents variation in pixel aperture ratio among liquid crystal devices.

Note that, in the above first and second embodiments, the body portion 25h of the BM 25 and the body portion 25h of the BM 250 each are patterned along the semiconductor layer 1 to form an island shape in a direction in which the data line 6a extends, but the configuration is not limited to it. When the semiconductor layer 1 is formed so as to extend in a direction in which the scanning line 11a extends, that is, formed in a direction that intersects with the data line 6a, it is possible to obtain the same advantageous effects as those of the first and second embodiments when the body portion 25h of the BM 25 and the body portion 25h of the BM 250 each are formed to have an island shape that extends in the direction in winch the scanning line 11a extends.

In addition, in the above described first and second embodiments, the body portion 25h of the BM 25 and the body portion 25h of the BM 250 each are arranged so as to overlap the semiconductor layer 1. However, when the semiconductor layer 1 has an existing LDD structure, in order to shield light from entering the channel region 1a, only portion of the body portion 25h of the BM 25 and only portion of the body portion 25h of the BM 250, which at least overlap the LDD region in the source region and drain region of the semiconductor layer 1, may be formed wider than the light shielding film formed on the TFT substrate 10.

Third Embodiment

Figure 10:
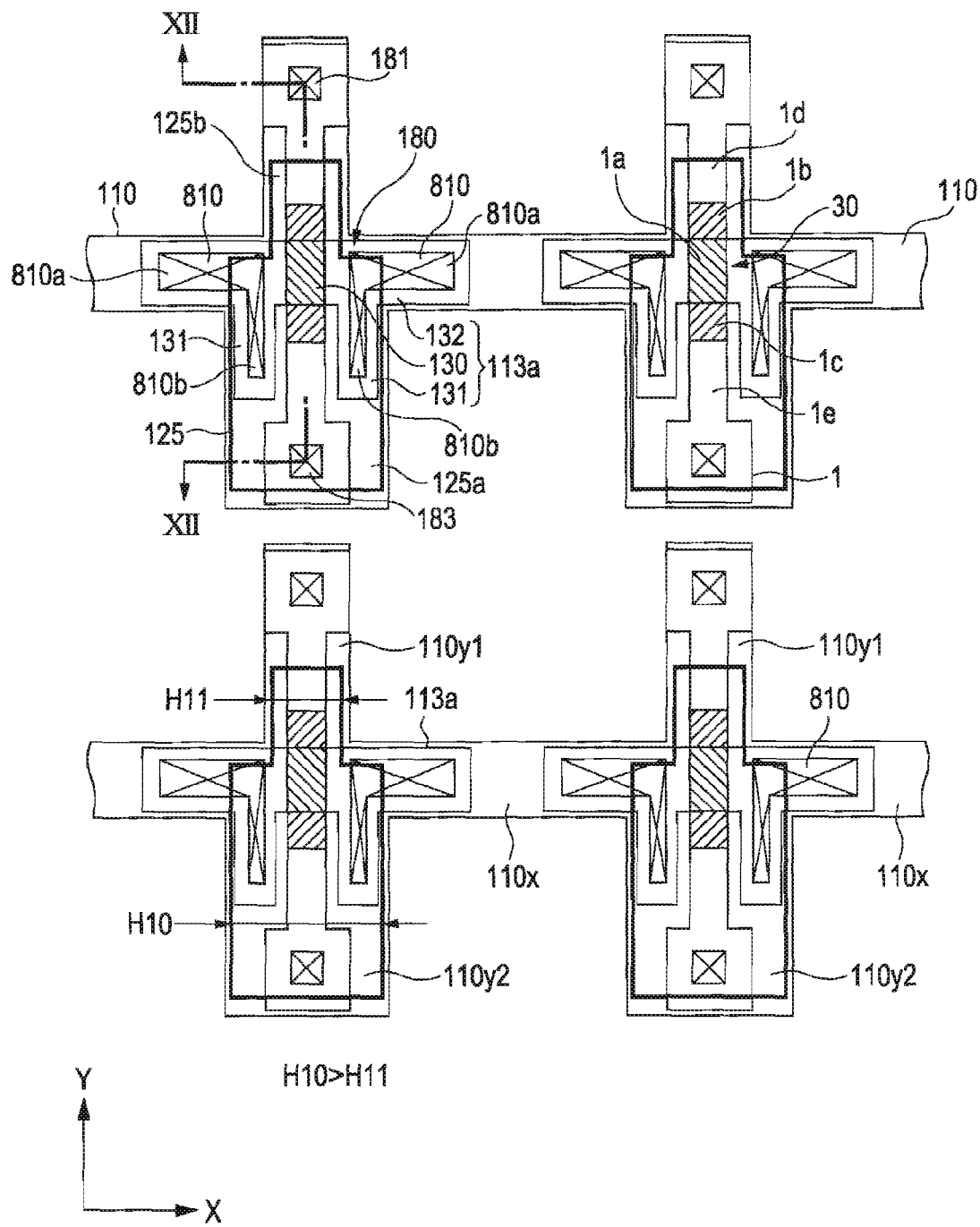
FIG. 10 is a partial plan view showing portion of the lower layer of a deposition pattern that is laminated on a TFT substrate and arrangement of one of BMs formed on an opposite substrate in a liquid crystal device according to a third embodiment of the invention.
Figure 11:
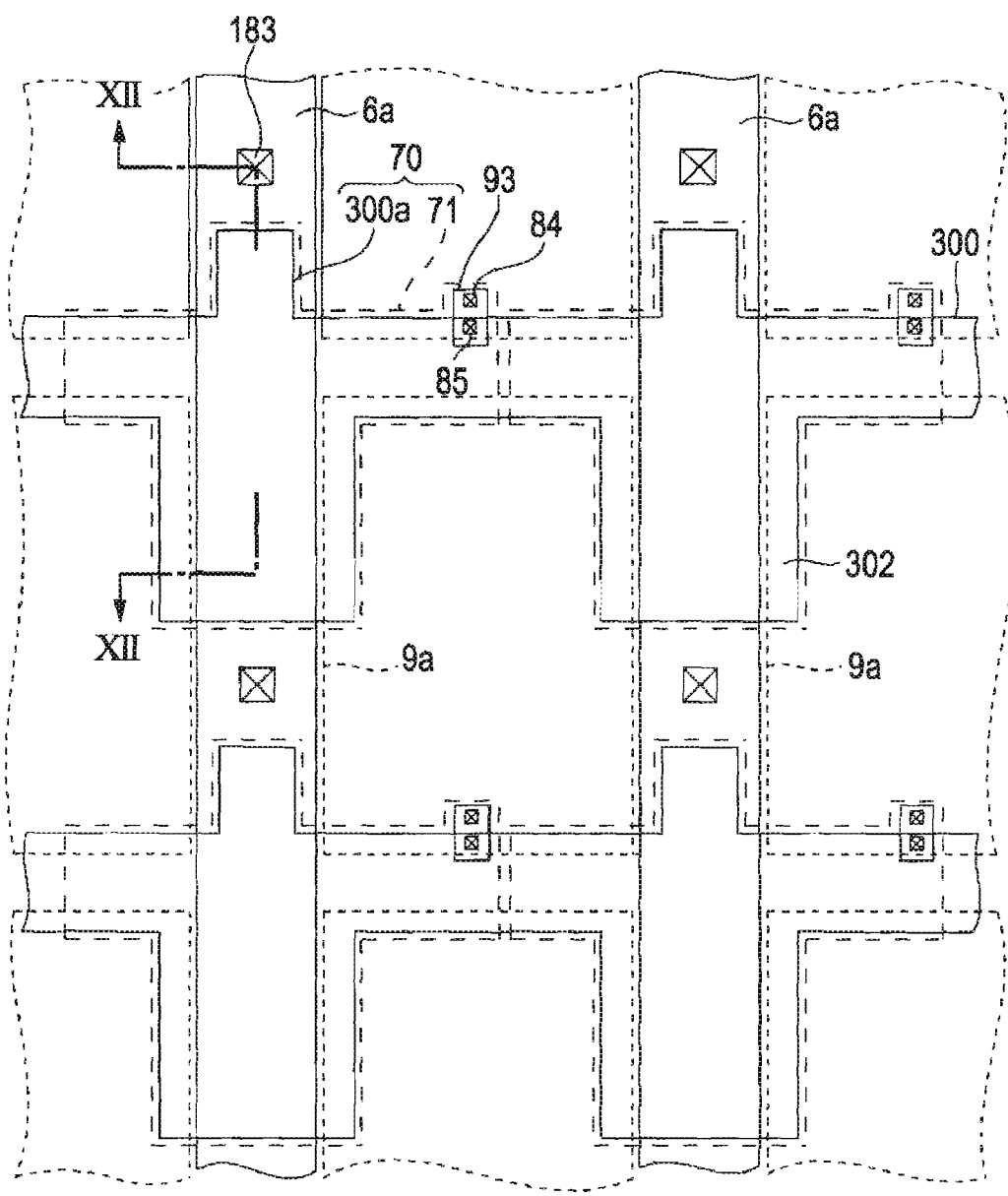
FIG. 11 is a partial plan view showing portion of the upper layer of the deposition pattern that is laminated on the TFT substrate of the liquid crystal device according to the third embodiment.
Figure 12:
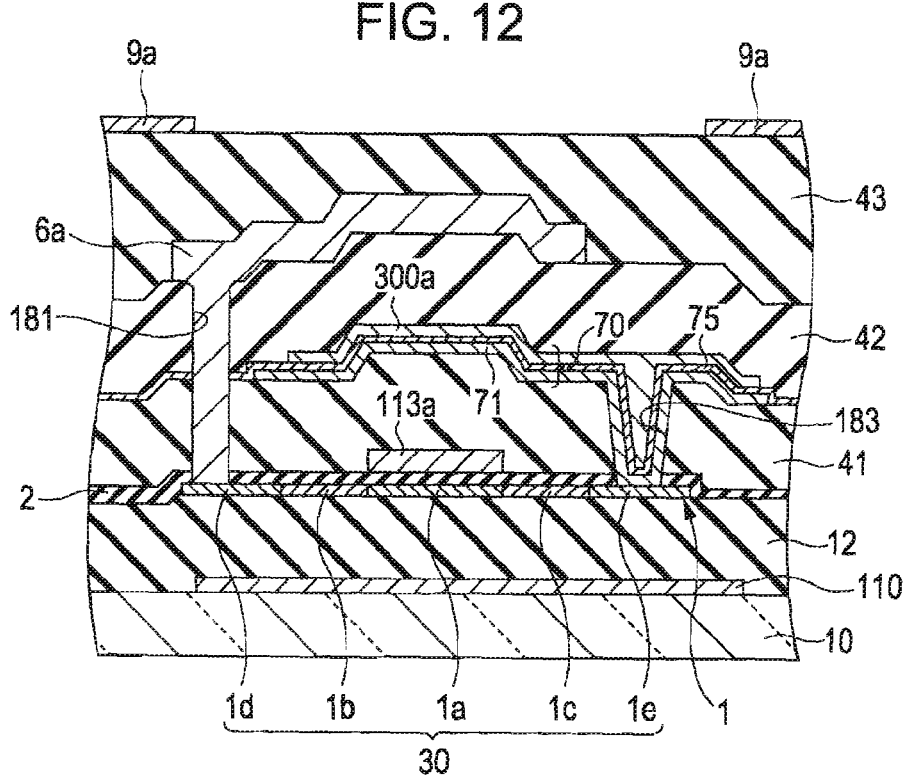
FIG. 12 is a cross-sectional view, taken along the line XII-XII in FIG. 10 and FIG. 11, showing the TFT substrate when the configuration shown in FIG. 10 and the configuration shown in FIG. 11 are laminated.

FIG. 10 is a partial plan view showing portion of the lower layer of a deposition pattern that is laminated on a TFT substrate and arrangement of BMs formed on an opposite substrate in a liquid crystal device according to the present embodiment. FIG. 11 is a partial plan view showing portion of the upper layer of the deposition pattern that is laminated on the TFT substrate of the liquid crystal device according to the present embodiment. FIG. 12 is a cross-sectional view, taken along the line XII-XII in FIG. 10 and FIG. 11, showing the TFT substrate when the configurations shown in FIG. 10 and the configuration shown in FIG. 11 are laminated.

The configuration of the liquid crystal device according to the third embodiment is only different from the liquid crystal device 100 according to the first embodiment and the liquid crystal device according to the second embodiment in that, as viewed in plan, the shape of each scanning line and the shape of each island BM formed on the opposite substrate. Thus, only the difference will be described, the same reference numerals are assigned to the same or similar components as those of the liquid crystal device 100 according to the first embodiment and those of the liquid crystal device according to the second embodiment, and a description thereof is omitted.

As shown in FIG. 10 and FIG. 11, in the display area 10h of the TFT substrate 10, a plurality of scanning lines 110 that supply signals to turn on/off gate electrodes 113a, which will be described later, and a plurality of data lines 6a that supply image signals to pixel electrodes 9a are wired in a matrix so as to intersect with each other. The pixel electrodes 9a are arranged in a matrix in regions that are defined by the scanning lines 110 and the data lines 6a. Note that the scanning lines 110 have the equivalent function to that of the above described scanning lines 11a.

Then, TFTs 30 are provided at positions corresponding to crossover regions 180 of the plurality of scanning lines 110 and the plurality of data lines 6a. Each of the pixel electrodes 9a is electrically connected to a corresponding one of the TFTs 30.

The scanning lines 110, the data lines 6a, storage capacitors 70, relay layers 93 and the TFTs 30 are arranged on the TFT substrate 10 within non-aperture regions that surround the aperture regions of the pixels (light transmission regions of the pixels) corresponding to the pixel electrodes 9a as viewed in plan.

As shown in FIG. 12, various components, such as the scanning lines 110, the TFTs 30, the storage capacitors 70, the pixel electrodes 9a, and the like, are provided on the TFT substrate 10 in the form of lamination structure.

This lamination structure is constituted of, from the lower side, a first layer that includes the scanning lines 110, a second layer that includes the TFTs 30 having the gate electrodes 113a, and the like, a third layer that includes the storage capacitors 70, a fourth layer that includes the data lines 6a, and the like, and an uppermost fifth layer that Includes the pixel electrodes 9a, and the like.

In addition, a base insulating film 12 is provided between the first layer and the second layer. A first interlayer insulating film 41 is provided between the second layer and the third layer. A second interlayer insulating film 42 is provided between the third layer and the fourth layer. A third interlayer insulating film 43 is provided between the fourth layer and the fifth layer. These insulating films 12, 41, 42, 43 prevent short circuit from occurring between the above described components.

These components will now be described in order from the lower side layer. Note that, of the above described lamination structure, the first to second layers are shown in FIG. 10 as a plan view, and the third to fifth layers are shown in FIG. 11 as a plan view.

As shown in FIG. 12, the scanning lines 110 are provided as the first layer. As shown in FIG. 10, the scanning lines 110 are patterned into a stripe shape so as to extend along the X direction. Specifically, each of the scanning lines 110 includes a main line portion 110x that extends along the X direction and projecting portions 110y1, 110y2 that project, in each of the crossover regions 180, from the main line portion 110x in the Y direction along the data line 6a.

Note that, as shown in FIG. 10, in the Y direction along the data line 6a, the projecting portion 110y2 that projects toward a first source/drain region 1e, which will be described later, is wider in the X direction in plan view than the projecting portion 110y1 that projects toward a second source/drain region 1d. Furthermore, the projecting portion 110y2 is wider in the X direction than the data line 6a. Moreover, the projecting portions 110y1 of the scanning lines 110 and the projecting portions 110y2 of the adjacent scanning lines 110 in the Y direction are not connected to each other.

Each of the scanning lines 110 is provided so that the main line portion 110x and each pair of projecting portions 110y1, 110y2 at least partially overlap, in the corresponding semiconductor layer 1, the channel region 1a, which will be described later, the first source/drain region 1e, a first LDD region 1c, a second LDD region 1b, elongated portions 810b of contact holes 810, which extend toward the first source/drain region 1e in the Y direction, as shown in FIG. 10.

Each of the scanning lines 110 covers at least the first LDD region 1c of the semiconductor layer 1 of the TFT 30 from below in plan view, specifically, each of the scanning lines 110 not only covers the first LDD region 1c, but also covers the channel region 1a, the first source/drain region 1e, the second LDD region 1b, and the elongated portions 810b of the contact holes 810 from the below so as to serve as a light shielding film, formed on the TFT substrate 10, that at least shields light from entering the first LDD region 1c from below. Thus, each of the scanning lines 110 constitutes a lower side light shielding film in the present embodiment.

Note that the TFT substrate 10 may be provided with other lower side light shielding films, in addition to the scanning lines 110, that at least shield light from entering the first LDD regions 1c from below. In this case, the lower side light shielding films may be formed so as to overlap the corresponding scanning lines 110 in plan view or may be formed to at least overlap the first LDD regions 1c in plan view.

Further, each of the lower side light shielding films that are formed separately from the scanning lines 110, as long as they overlap the first LDD regions 1c in plan view, may be formed so as to overlap, in addition to the first LDD region 1c, any one or all of the channel region 1a, the first source/drain region 1e, the first LDD region 1c, the second LDD region 1b, the elongated portions 810b of the contact holes 810 in plan view.

As shown in FIG. 12, the TFTs 30 are provided as the second layer. As shown in FIG. 10 and FIG. 12, each of the TFTs 30 includes the semiconductor layer 1, the gate insulating film 2, and the gate electrode 113a.

Each of the semiconductor layers 1 has an LDD structure that includes the channel region 1a, the first source/drain region 1e, the first LDD region 1c, which is an LDD region adjacent to the first source/drain region, the second source/drain region 1d, the second LDD region 1b, which is an LDD region adjacent to the second source/drain region.

The second source/drain region 1d and the first source/drain region 1e are formed along the Y direction substantially symmetrically with respect to the channel region 1a. The second LDD region 1b is formed between the channel region 1a and the second source/drain region 1d. In addition, the first LDD region 1c is formed between the channel region 1a and the first source/drain region 1e.

The first source/drain region 1e, the first LDD region 1c, the second source/drain region 1d and the second LDD region 1b are formed in such a manner that impurities are implanted into the semiconductor layer 1 through, for example, ion implantation process, or the like.

The first LDD region 1c and the second LDD region 1b are formed to be regions that have smaller implanted impurities than the first source/drain region 1e and the second source/drain region 1d.

In this manner, the semiconductor layer 1, when having a LDD structure, is able to reduce off current that flows through the first source/drain region 1e and the second source/drain region 1d when the TFT 30 is not operating, and also able to suppress a decrease in on current that flows when TFT 30 is operating and an increase in off leakage current.

The contact holes 810, which are first contact holes, are formed in the base insulating film 12. The contact hole 810, as shown in FIG. 10, in each of the crossover regions 180, includes an elongated portion 810a and the elongated portion 810b and is formed to have an L shape. The elongated portion 810a is a first elongated portion that extends in the X direction on one of the sides of the semiconductor layer 1 in the X direction in plan view. The elongated portion 810b is a second elongated portion that extends in the Y direction toward the first source/drain region 1e.

Each of the contact holes 810 is used to electrically connect the scanning line 110 to the gate electrode 113a of the TFT 30 and is formed to extend through the gate insulating film 2 and the base insulating film 12. Note that each of the contact holes 810 has the equivalent function to those of the contact holes 12cv in the above described first and second embodiments.

As shown in FIG. 10 and FIG. 12, the gate electrodes 113a are provided in the layer above the semiconductor layer 1 via the gate insulating film 2. As shown in FIG. 10, each of the gate electrodes 113a includes a body portion 130, elongated portions 132 and elongated portions 131. The body portion 130 overlaps the channel region 1a of the TFT 30 as viewed in plan. The elongated portions 132 extend from the body portion 130 along the X direction. The elongated portions 131, on both sides of the semiconductor layer 1, extend from the body portion 130 along the Y direction toward the first source/drain region 1e. Note that each of the gate electrodes 113a has the equivalent function to those of the above described first and second embodiments.

As shown in FIG. 12, the storage capacitors 70 are provided as the third layer. Each of the storage capacitors 70 is formed so that a lower capacitor electrode 71 and an upper capacitor electrode 300a are opposed via a dielectric film 75.

As shown in FIG. 11 and FIG. 12, the upper capacitor electrode 300a is formed as a portion of the capacitor line 300. The capacitor line 300 is arranged around the pixel electrodes 9a that are arranged in the display area 10h.

Each of the upper capacitor electrodes 300a is a fixed-potential capacitor electrode, which is electrically connected through the capacitor line 350 to a constant-potential source and maintained at a fixed potential. In addition, each of the upper capacitor electrodes 300a also has a function of shielding light from entering the corresponding TFT 30 from the upper layer side.

Each of the lower capacitor electrodes 71 is a pixel potential capacitor electrode, which is electrically connected to the first source/drain region 1e and the pixel electrode 9a. More specifically, each of the lower capacitor electrodes 71 is electrically connected through a contact hole 183, which is a second contact hole, to the first source/drain region 1e, and electrically connected through a contact hole 84, which is formed through the second interlayer insulating film 42 and the dielectric film 75, to the relay layer 93.

Furthermore, each of the relay layers 93 is electrically connected through a contact hole 85, which is formed through the third Interlayer insulating film 43, to the pixel electrode 9a. That is, each of the lower capacitor electrodes 71, in cooperation with the relay layer 93, relays electrical connection between the first source/drain region 1e and the pixel electrode 9a. Note that each of the lower capacitor electrodes 71 has a function of shielding light from entering the corresponding TFT 30 from the upper layer side.

Further, as shown in FIG. 10 and FIG. 11, each of the storage capacitors 70 is formed to cover the pair of contact holes 810 as viewed in plan.

As shown in FIG. 12, the data lines 6a are provided as the fourth layer. As shown in FIG. 11, the data lines 6a are patterned to form a stripe shape along the Y direction. In addition, in the fourth layer, the relay layers 93 are formed in the same layer as the data lines 6a.

As shown in FIG. 11 and FIG. 12, each or the data lines 6a is electrically connected to the second source/drain region 1d of the corresponding semiconductor layer 1 through a contact hole 181 that extends through the first interlayer insulating film 41, the dielectric film 75 and the second interlayer insulating film 42. Further, each of the data lines 6a shields light from entering the corresponding TFT 30 from the upper layer side.

As shown in FIG. 12, the pixel electrodes 9a are provided as the fifth layer. As shown in FIG. 11 and FIG. 12, each of the pixel electrodes 9a is electrically connected through the lower capacitor electrode 71, the contact holes 183, 84, 85 and the relay layer 93 to the first source/drain region 1e of the semiconductor layer 1.

Here, BMs 125 made of, for example, aluminum, chromium, or the like, are provided at positions corresponding to the crossover regions 180 of the scanning lines 110 and the data lines 6a in the peripheral regions of the pixels in the display area 20h on the surface 20f of the opposite substrate 20. Each of the BMs 125 has the equivalent function to that of the above described BM 25.

Each of the BMs 125 is patterned to form an island shape such that the BM 125, when the opposite substrate 20 is bonded to the TFT substrate 10, at least partially overlaps the first LDD region 1c of the semiconductor layer 1 of the TFT 30 in the crossover region 180 in plan view as shown in FIG. 10 and at least partially overlaps portion of the scanning line 110 in plan view.

Specifically, when the opposite substrate 20 is bonded to the TFT substrate 10, each of the BMs 125, in the crossover region 180, is arranged along the Y direction in plan view and includes a projecting portion 125a that projects in the Y direction toward the first source/drain region 1e and a projecting portion 125b that projects in the Y direction toward the second source/drain region 1d.

The width H10 of the projecting portion 125a in the X direction is larger in the X direction in plan view than then width H11 of the projecting portion 125b in the X direction (H10>H11). That is, each of the BMs 125 is formed to have an upward convex shape along the Y direction in plan view. In addition, the width of the projecting portion 125a in the X direction is larger than the width of the data line 6a in the X direction.

Further, when the opposite substrate 20 is bonded to the TFT substrate 10, the projecting portion 125a is patterned to form an island shape such that the projecting portion 125a at least partially overlaps the projecting portion 110y2 of the scanning line 110 in plan view, and the projecting portion 125b is patterned to form an island shape such that the projecting portion 125b at least partially overlaps the projecting portion 110y1 of the scanning line 110.

More specifically, when the opposite substrate 20 is bonded to the TFT substrate 10, each of the BMs 125 is patterned to form an island shape such that the projecting portions 125a, 125b overlap, in the corresponding semiconductor layer 1, the channel region 1a, the first source/drain region 1e, the first LDD region 1c, the second LDD region 1b, the elongated portions 810b of the contact holes 810 as viewed in plan, as shown in FIG. 10.

Each of the BMs 125 is arranged so as to at least partially overlap the first LDD region 1c of the semiconductor layer 1 in plan view. Thus, each of the BMs 125, in cooperation with the data line 6a, the lower capacitor electrode 71 and the upper capacitor electrode 300a on the side of the above described TFT substrate 10, shields light from entering the corresponding LDD region 1c from above.

Note that each of the BMs 125 needs to at least shield light from entering the first LDD region 1c because, when the TFT 30 operates, an optical leakage current is more likely to occur in the first LDD region 1c than in the second LDD region 1b. That is, during operation of the TFT 30, leakage current in the TFT 30 is more likely to occur when light enters the first LDD region 1c than when light enters the secondly LED region 1b.

In this manner, in the present embodiment, each of the scanning lines 110 includes, in the crossover region 180, the projecting portions 110y1, 110y2 that project from the body portion 110x in the Y direction along the data line 6a, and the projecting portion 110y2 is wider in the X direction in plan view than the projecting portion 110y1.

Each of the BMs 125 is patterned to form an island shape such that the BM 125, when the opposite substrate 20 is bonded to the TFT substrate 10, at least partially overlaps the first LDD region 1c of the 1 of the TFT 30 in, the crossover region 180 in plan view as shown in FIG. 10 and at least partially overlaps portion of the scanning line 110 in plan view.

Specifically, the width H10 of the projecting portion 125a of the BM 125 in the X direction is larger in plan view than the width H11 of the projecting portion 125b in the X direction (H11>H11). The projecting portion 125a is patterned to form an island shape such that the projecting portion 125a at least partially overlaps the projecting portion 110y2 of the scanning line 110 in plan view. The projecting portion 125b is patterned to form an island shape such that the projecting portion 125b at least partially overlaps the projecting portion 110y1 of the scanning line 110 in plan view.

More specifically, each of the BMs 125 is patterned to form an island shape such that, owing to the projecting portions 125a, 125b, the BM 125 overlaps, in the semiconductor layer 1, the channel region 1a, the first source/drain region 1e, the first LDD region 1c, the second LDD region 1b and the elongated portions 810b of the contact holes 810 as viewed in plan, as shown in FIG. 10.

Accordingly, even when the opposite substrate 20 is bonded to the TFT substrate 10 with poor positional accuracy, that is, even when a positional deviation occurs, using the island BMs 125 that slightly protrude into the light transmission regions of pixels, it is possible to reduce variation in aperture ratio among pixels in the display area of the electro-optical device and also possible to prevent variation in pixel aperture ratio among liquid crystal devices.

In addition, each of the BMs 125 is arranged so as to cover the first LDD region 1c over a wide region in plan view. Even when the opposite substrate 20 is bonded to the TFT substrate 10 with poor positional accuracy, it is possible for the BMs 125 to reliably cover the first LDD regions 1c in plan view.

That is, the BMs, in cooperation with the lower side light shielding films, reliably shield light from entering the first LDD regions 1c. Thus, it is possible to provide an electro-optical device that is able to suppress occurrence of leakage current in the TFTs 30 and occurrence of defective display due to light entering ton first LDD regions 1c of the semiconductor layers 1 formed on the TFT substrate 10.

Figure 13:
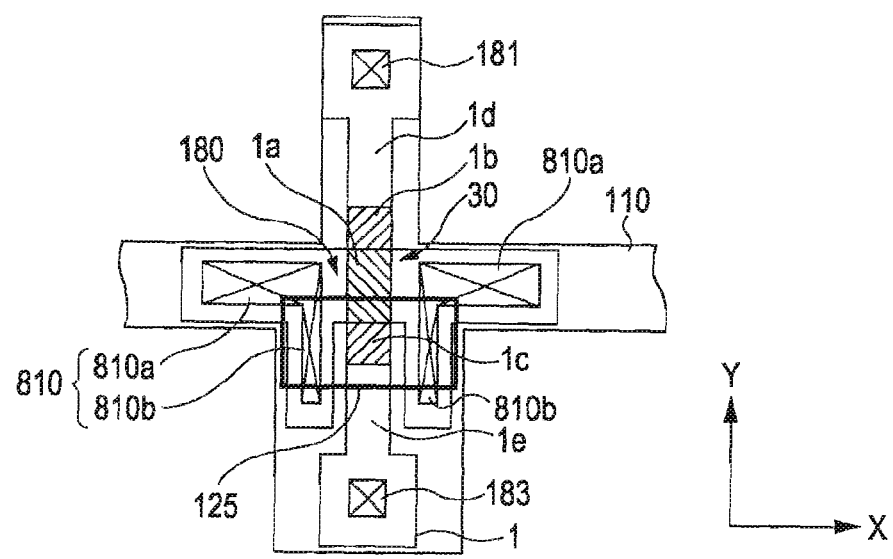
FIG. 13 is a partial plan view showing portion of the lower layer of the deposition pattern that is laminated on the TFT substrate and arrangement of one of BMs that have a shape different from that of FIG. 10 and that are formed on the opposite substrate.
Figure 14:
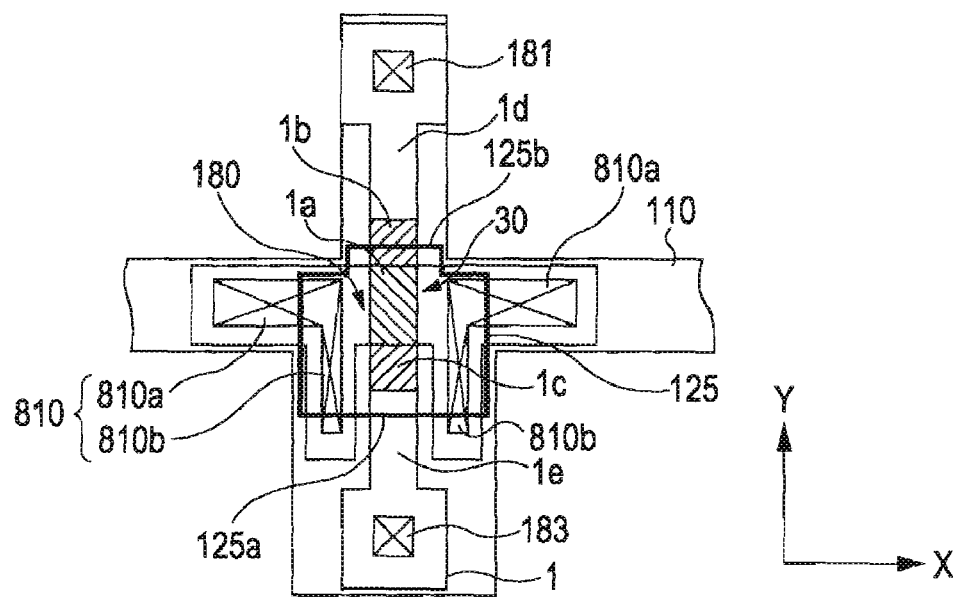
FIG. 14 is a partial plan view of portion of the lower layer of the deposition pattern that is laminated on the TFT substrate and arrangement of one of BMs that have a shape different from those of FIG. 10 and FIG. 13 and that are formed on the opposite substrate.

Alternative examples of the present embodiment will be described with reference to FIG. 13 to FIG. 17. FIG. 13 is a partial elan view showing portion of the lower layer of a deposition pattern that is laminated on the TFT substrate and arrangement of BMs, formed on the opposite substrate, that have a shape different from that of FIG. 10. FIG. 14 is a partial plan view showing portion of the lower layer of a deposition pattern that is laminated on the TFT substrate and arrangement of BMs, formed on the opposite substrate, that have a shape different from those of FIG. 10 and FIG. 13.

Figure 15:
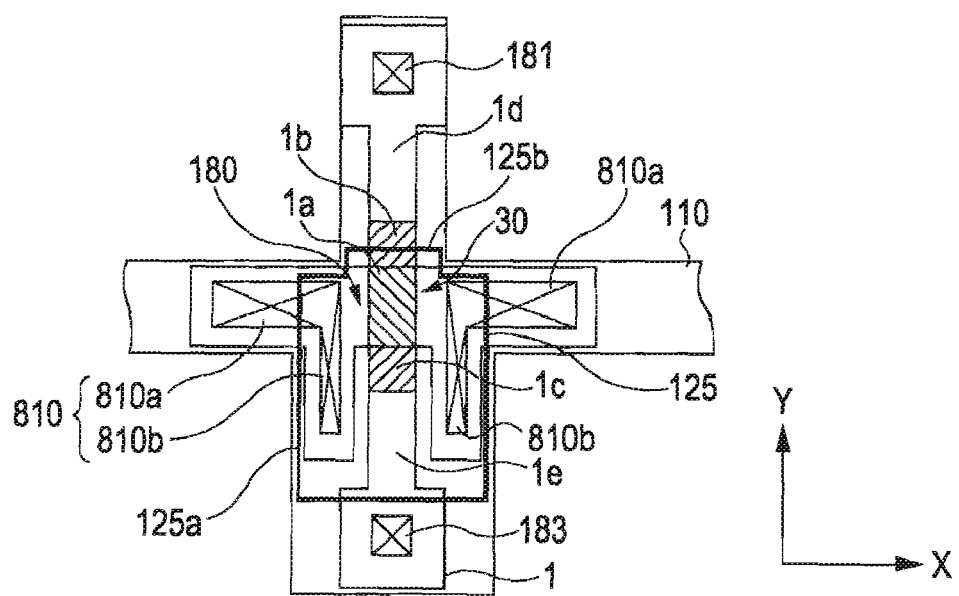
FIG. 15 is a partial plan view showing portion of the lower layer of the deposition pattern that is laminated on the TFT substrate and arrangement of one of BMs that have a shape different from those of FIG. 10, FIG. 13, and FIG. 14 and that are formed on the opposite substrate.
Figure 16:
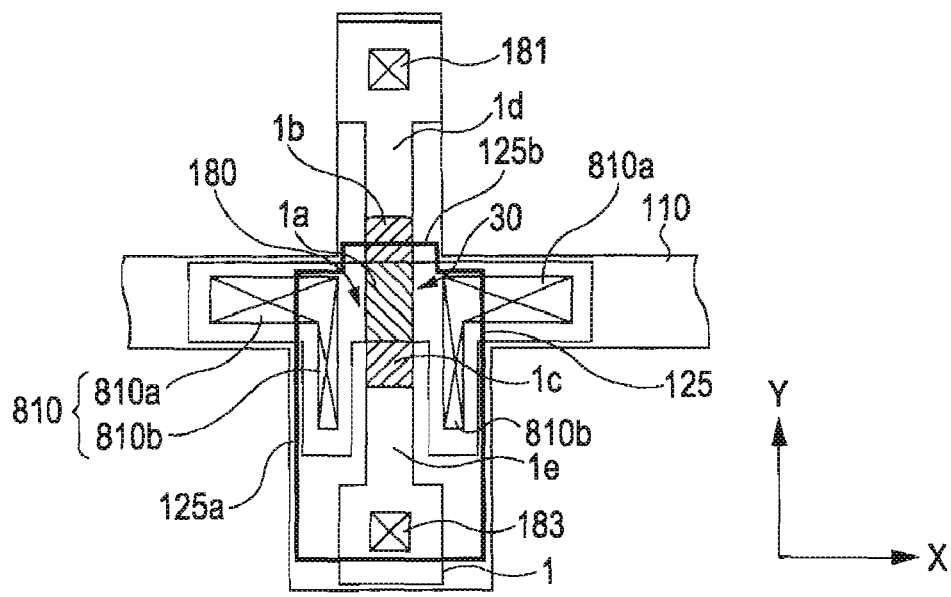
FIG. 16 is a partial plan view showing portion of the lower layer of the deposition pattern that is laminated on the TFT substrate and arrangement of one of BMs that have a shape different from those of FIG. 10, and FIG. 13 to FIG. 15 and that are formed on the opposite substrate.
Figure 17:
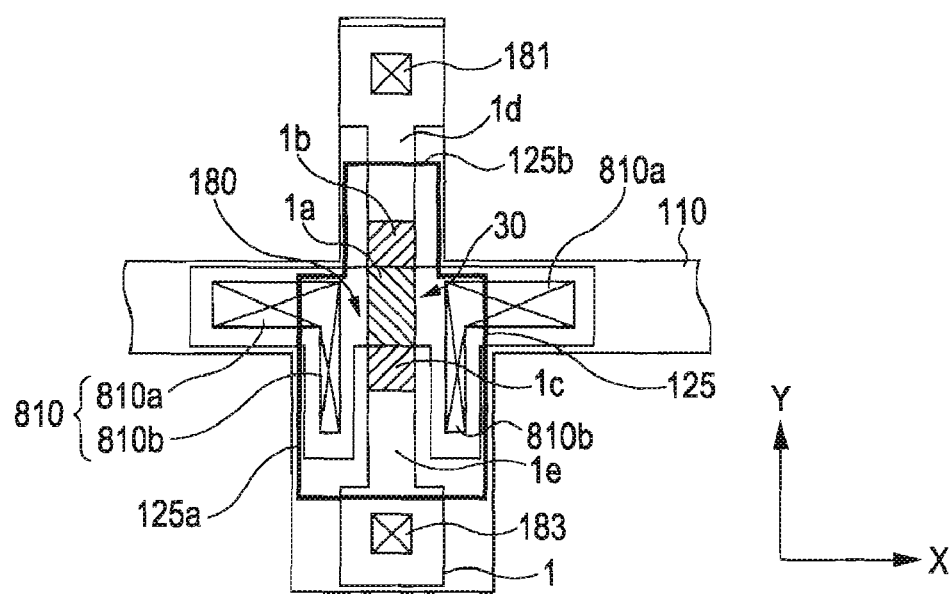
FIG. 17 is a partial plan view showing portion of the lower layer of the deposition pattern that is laminated on the TFT substrate and arrangement of one of BMs that have a shape different from those of FIG. 10, and FIG. 13 to FIG. 16 and that are formed on the opposite substrate.

FIG. 15 is a partial plan view showing portion of the lower layer of a deposition pattern that is laminated on the TFT substrate and arrangement of BMs, formed on the opposite substrate, that have a shape different from those of FIG. 10, FIG. 13, and FIG. 14. FIG. 16 is a partial plan view showing portion of the lower layer of a deposition pattern that is laminated on the TFT substrate and arrangement of BMs, formed on the opposite substrate, that have a shape different from those of FIG. 10, and FIG. 13 to FIG. 15. FIG. 17 is a partial plan view showing portion of the lower layer of a deposition pattern that is laminated on the TFT substrate and arrangement of BMs, formed on the opposite substrate, that have a shape different from those of FIG. 10, and FIG. 13 to FIG. 16.

In the present embodiment, each of the BMs 125, when the opposite substrate 20 is bonded to the TFT substrate 10, is patterned to form an island shape such that the BM 125 overlaps, in the semiconductor layer 1, the channel region 1a, the first source/drain region 1e, the first LDD region 1c, the second LDD region 1b, the elongated portions 810b of the contact holes 810 as viewed in plan.

The configuration is not limited to it. Each of the BMs 125 may be patterned to form an island shape such that, when the opposite substrate 20 is bonded to the TFT substrate 10, the BM 125 only overlaps a region that includes the first LDD region 1c as viewed in plan, as shown in FIG. 13. Note that this also applies to a case where the lower side light shielding films are formed in addition to the scanning lines 110.

Accordingly, even when the opposite substrate 20 is bonded to the TFT substrate 10 with poor positional accuracy, using the island BMs 125 that protrude into the light transmission regions of pixels in a smaller area than the present embodiment, it is possible to reduce variation in aperture ratio among pixels in the display area of the electro-optical device and also possible to prevent variation in pixel aperture ratio among liquid crystal devices.

In addition, each of the BMs 125 reliably shields light from entering the first LDD region 1c with a minimum area. Thus, it is possible to provide an electro-optical device that is able to suppress occurrence of leakage current in the TFTs 30 and occurrence of defective display due to light entering the first LDD regions 1c of the semiconductor layers 1 formed on the TFT substrate 10 in cooperation with the lower side light shielding films.

The configuration is not limited to it. Each of the BMs 125 may be patterned to form an island shape such that, when the opposite substrate 20 is bonded to the TFT substrate 10, the BM 125 only overlaps a region that includes the first LDD region 1c and the channel region 1a as viewed in plan, as shown in FIG. 14. Note that this also applies to a case where the lower side light shielding films are formed in addition to the scanning lines 110.

Accordingly, even when the opposite substrate 20 is bonded to the TFT substrate 10 with poor positional accuracy, using the island BMs 125 that protrude into the light transmission regions of pixels in a smaller area than the present embodiment, it is possible to reduce variation in aperture ratio among pixels in the display area of the electro-optical device and also possible to prevent variational in pixel aperture ratio among liquid crystal devices.

In addition, as viewed in plan, each of the BMs 125 and each of the lower side light shielding films reliably shield light from entering the channel region 1a in addition to the first LDD region 1c in a larger area than the BM 125 shown in FIG. 13. Thus, it is possible to provide an electro-optical device that is able to suppress occurrence of leakage current in the TFTs 30 and occurrence of defective display due to light entering the first LDD regions 1c and the channel regions 1a in the semiconductor layers 1 formed on the TFT substrate 10.

The configuration is not limited to it. Each of the BMs 125 may be patterned to form an island shape such that, when the opposite substrate 20 is bonded to the TFT substrate 10, each of the BMs 125 only overlaps a region that includes the channel region 1a and the elongated portions 810b of the contact holes 810 in addition to the first LDD region 1c as viewed in plan, as shown in FIG. 15. Note that this also applies to a case where the lower side light shielding films are formed in addition to the scanning lines 110.

Accordingly, even when the opposite substrate 20 is bonded to the TFT substrate 10 with poor positional accuracy, using the island BMs 125 that protrude into the light transmission regions of pixels in a smaller area than the present embodiment, it is possible to reduce variation in aperture ratio among pixels in the display area of the electro-optical device and also possible to prevent variation in pixel aperture ratio among liquid crystal devices.

In addition, as viewed in plan, each of the BMs 125 and each of the lower side light shielding films reliably shield light from entering the elongated portions 810b of the contact holes 810 in addition to the channel region 1a and the first LDD region 1c in a larger area than that of the alternative examples shover in FIG. 13 and FIG. 14. Thus, it is possible to provide an electro-optical device that is able to suppress occurrence of leakage current in the TFTs 30 and occurrence of defective display due to light entering the first LDD regions 1c of the semiconductor layers 1 formed on the TFT substrate 10 more reliably than the configuration shown in FIG. 13 and the configuration shown in FIG. 14.

Furthermore, the configuration is not limited to it. Each of the BMs 125 may be patterned to form an island shape such that, when the opposite substrate 20 is bonded to the TFT substrate 10, each of the BMs 125 only overlaps a region that includes the channel region 1a, the elongated portions 810b of the contact holes 810 and the contact hole 183 in addition to the first LDD region 1c as viewed in plan, as shown in FIG. 16. Note that this also applies to a case where the lower side light shielding films are formed in addition to the scanning lines 110.

Accordingly, even when the opposite substrate 20 is bonded to the TFT substrate 10 with poor positional accuracy, using the island BMs 125 that protrude into the light transmission regions of pixels in a smaller area than the present embodiment, it is possible to reduce variation in aperture ratio among pixels in the display area of the electro optical device and also possible to prevent variation in pixel aperture ratio among liquid crystal devices.

In addition, as viewed in plan, each of the BMs 125 and each of the lower side light shielding films reliably shield light from entering the contact hole 183 in addition to the elongated portions 810b of the contact holes 810, the channel region 1a and the first LDD region 1c in a larger area than that of the alternative examples shown in FIG. 13 to FIG. 15. Thus, it is possible to provide an electro-optical device that is able to suppress occurrence of leakage current in the TFTs 30 and occurrence of defective display due to light entering the first LDD regions 1c of the semiconductor layers 1 formed on the TFT substrate 10 more reliably than the configurations shown in FIG. 13 to FIG. 15.

The configuration is not limited to it. Each of the BMs 125 may be patterned to form an island shape such that, when the opposite substrate 20 is bonded to the TFT substrate 10, each of the BMs 125 only overlaps a region that includes the second LDD region 1*b* in addition to the channel region 1*a*, the elongated portions 810*b* of the contact holes 810 and the first LDD region 1*c* as viewed in plan, as shown in FIG. 17.

In other words, it is not necessary for each of the BMs 125 to be patterned to overlap the contact hole 183. Note that this also applies to a case where the lower side light shielding films are formed in addition to the scanning lines 110.

Accordingly, even when the opposite substrate 20 is bonded to the TFT substrate 10 with poor positional accuracy, using the island BMs 125 that protrude into the light transmission regions of pixels in a smaller area than the present embodiment, it is possible to reduce variation in aperture ratio among pixels in the display area of the electro-optical device and also possible to prevent variation in pixel aperture ratio among liquid crystal devices.

In addition, as viewed in plan, each of the BMs 125 and each of the lower side light shielding films reliably shield light from entering the second LDD region 1*b* in addition to the elongated portions 810*b* of the contact holes 810, then channel region 1*a* and the first LDD region 1*c* in a larger area than those of the alternative examples shown in FIG. 13 to FIG. 15. Thus, it is possible to provide an electro-optical device that is able to suppress occurrence of leakage current in the TFTs 30 and occurrence of defective display due to light entering the first LDD regions 1*c* of the semiconductor layers 1 formed on the TFT substrate 10 more reliably than the configurations shown in FIG. 13 to FIG. 15.

INDUSTRIAL APPLICABILITY

The liquid crystal device is not limited to the above illustrated examples, but it may be modified into various forms without departing from the scope of the invention. For example, the above described liquid crystal device is described using an active matrix liquid crystal display module that employs active elements, such as TFTs (thin-film transistors) as an example. The liquid crystal device is not limited to it. The liquid crystal device may be an active matrix liquid crystal display module that employs active elements, such as TFT (thin-film diodes).

Furthermore, in the above described first to third embodiments, the electro-optical device is described using the liquid crystal device as an example. However, the embodiment of the invention is not limited to it. The embodiment of the invention may be applied to various electro-optical devices that include an electro luminescence device, particularly, such as an organic electro luminescence device and an inorganic electro luminescence device, a plasma display device, an FED (field emission display) device, an SED (surface-conduction electron-emitter display) device, an LED (light emitting diode) display device, an electrophoretic display device, a device that uses a small television having installed a thin cathode-ray tube, a liquid crystal shutter, or the like.

In addition, the electro-optical device may be a display device in which elements are formed on a semiconductor substrate, such as LCOS (liquid crystal on silicon), for example. The LCOS uses a single crystal silicon substrate as an element substrate, and transistors are formed on the single crystal silicon substrate as switching elements used for pixels and peripheral circuits. Further, each of the pixels uses a reflective pixel electrode, and elements of each pixel are formed in the layer below the pixel electrode.

In addition, the electro-optical device may be a display device in which a pair of electrodes are formed in the same layer of one of the substrates, such as an IPS (in-plane switching), a display device in which a pair of electrodes are formed in one of the substrates through an insulating film, such as an FFS (fringe field switching), or the like.

Figure 9:
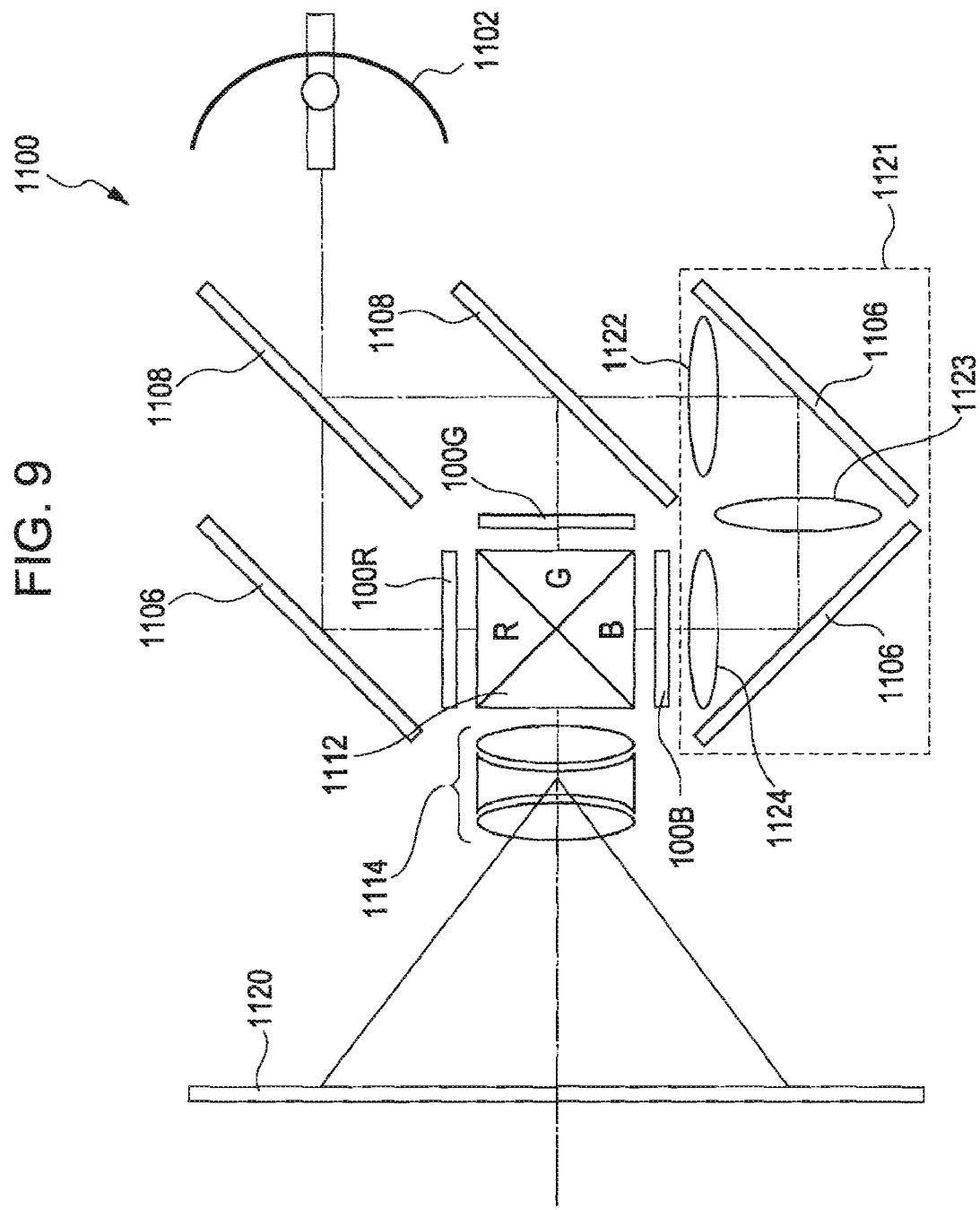
FIG. 9 is a view showing a configuration of a projector in which three liquid crystal devices shown in FIG. 1 are provided.

Moreover, an electronic apparatus that uses the liquid crystal device according to the embodiment of the invention includes a projection display device, specifically, a projector. FIG. 9 is a view showing a configuration of a projector in which three liquid crystal devices shown in FIG. 1 are provided.

As shown in the drawing, the projector 1100 is provided with three liquid crystal devices 100. These three liquid crystal devices 100R, 100G, 100B are, for example, provided as light bulbs for respective R, G, B.

In the projector 1100, when projection light is emitted from a white light source lamp unit 1102, such as a metal halide lamp, three mirrors 1106 and two dichroic mirrors 1108 split the emitted light into optical components R, G, B corresponding to three primary colors of RGB and then guided to light bulbs 100R, 100G, 100B corresponding to the respective colors.

Then, in order to prevent light loss through a long optical path, the B light is particularly guided through a relay lens system 1121 that consists of an entrance lens 1122, a relay lens 1123 and an exit lens 1124.

The optical components corresponding to three primary colors, which have been modulated by the respective light bulbs 100R, 100G, 100B, are recomposed by a dichroic prism 1112 and then projected through a projector lens 1114 to a screen 1120 as a color image.

What is claimed is:

1. An electro-optical device comprising:
   a first substrate and a second substrate that are opposed to each other;
   an electro-optical layer disposed between the first substrate and the second substrate;
   data lines disposed between the first substrate and the electro-optical layer;
   transistors electrically connected to corresponding ones of the data lines, each transistor including a semiconductor layer having a channel region, a first source/drain region, a first LDD region adjacent to the first source/drain region, a second source/drain region, and a second LDD region adjacent to the second source/drain region;
   a lower side light shielding film formed in a layer between the first substrate and the semiconductor layer, the lower side light shielding film shielding light from entering the first LDD regions from a first substrate side;
   island light shielding films provided between the second substrate and the electro-optical layer, the island light shielding films being isolated from each other and overlapping the corresponding first LDD region in plan view; and
   scanning lines that intersect with the data lines, the lower side light shielding film overlapping a corresponding one of the scanning lines in plan view.

2. The electro-optical device according to claim 1, further comprising:
   a pixel electrode that is provided on the first substrate, the pixel electrode being provided in a layer between the transistors and the first substrate in correspondence with a corresponding one of the transistors, the pixel electrode applying a driving voltage to the electrooptic material, the pixel electrode being electrically connected to a corresponding one of the first source/drain regions, and the corresponding second source/drain region being electrically connected to the corresponding data line.

3. An electronic apparatus having the electro-optical device according to claim 1.

4. An electro-optical device comprising:
a first substrate and a second substrate that are opposed to each other;
an electro-optical layer disposed between the first substrate and the second substrate;
data lines disposed between the first substrate and the electro-optical layer;
transistors electrically connected to corresponding ones of the data lines, each transistor including a semiconductor layer having a channel region, a first source/drain region, a first LDD region adjacent to the first source/drain region, a second source/drain region, and a second LDD region adjacent to the second source/drain region;
a lower side light shielding film formed in a layer between the first substrate and the semiconductor layer, the lower side light shielding film shielding light from entering the first LDD regions from a first substrate side; and
island light shielding films provided between the second substrate and the electro-optical layer, the island light shielding films being isolated from each other and overlapping the corresponding first LDD region in plan view;
wherein the lower side light shielding film serves as a scanning line.

5. An electro-optical device, comprising:
a first substrate and a second substrate that are opposed to each other;
an electro-optical layer disposed between the first substrate and the second substrate;
data lines disposed between the first substrate and the electro-optical layer;
transistors electrically connected to corresponding ones of the data lines, each transistor including a semiconductor layer having a channel region, a first source/drain region, a first LDD region adjacent to the first source/drain region, a second source/drain region, and a second LDD region adjacent to the second source/drain region;
a lower side light shielding film formed in a layer between the first substrate and the semiconductor layer, the lower side light shielding film shielding light from entering the first LDD regions from a first substrate side; and
island light shielding films provided between the second substrate and the electro-optical layer, the island light shielding films being isolated from each other and overlapping the corresponding first LDD region in plan view;
wherein the lower side light shielding film and the island light shielding films each include a first projecting portion and a second projecting portion that project in the direction in which the data lines extend in plan view, the first projecting portion overlapping the first source/drain region and the second projecting portion overlapping the second source/drain region, the first projecting portion being wider in plan view than the second projecting portion.

6. The electro-optical device according to claim 5, wherein the lower side light shielding film and the island light shielding films overlap the corresponding channel region of the semiconductor layer in plan view.

7. The electro-optical device according to claim 5, further comprising:
scanning lines intersecting with the data lines; and
a first contact hole having a first elongated portion and a second elongated portion, the first elongated portion extending in a direction in which the scanning lines extend in plan view, the second elongated portion extending in the direction in which the data line extends toward the first source/drain region, the first contact hole electrically connecting the scanning line to a gate electrode of the corresponding transistor provided in a layer above the channel region of the semiconductor layer, the lower side light shielding film and the island light shielding films at least partially overlap the corresponding second elongated portion of the first contact hole in plan view.

8. The electro-optical device according to claim 5, further comprising:
a second contact hole provided in the corresponding first source/drain region and used to electrically connect the first source/drain region to the pixel electrode, and wherein the lower side light shielding film and the island light shielding film at least partially overlap the corresponding second contact hole in plan view.

9. The electro-optical device according to claim 5, wherein the lower side light shielding film and the island light shielding film at least partially overlap the corresponding second LDD region.

10. An electro-optical device comprising:
a first substrate and a second substrate that are opposed to each other;
an electro-optical layer disposed between the first substrate and the second substrate;
a data line disposed between the first substrate and the electro-optical layer;
a transistor electrically connected to the data line, the transistor including a semiconductor layer having a channel region, a first source/drain region, a first LDD region adjacent to the first source/drain region, a second source/drain region, and a second LDD region adjacent to the second source/drain region; and
an island light shielding film provided between the second substrate and the electro-optical layer, the island light shielding film overlapping the corresponding first and second LDD region in plan view, the island light shielding film including a first projecting portion and a second projecting portion that project in the direction in which the data line extend in plan view, the first projecting portion overlapping the first source/drain region and the second projecting portion overlapping the second source/drain region, the first projecting portion being wider in plan view than the second projecting portion.

* * * * *